US011185872B2

(12) United States Patent
Walker

(10) Patent No.: US 11,185,872 B2
(45) Date of Patent: Nov. 30, 2021

(54) METHOD FOR CONVERTING A NATURALLY-ASPIRATED FLOTATION CELL TO A FORCED-GAS FLOTATION CELL, AND APPARATUS THEREOF

(71) Applicant: FLSmidth A/S, Valby (DK)

(72) Inventor: Mathew Walker, Salt Lake City, UT (US)

(73) Assignee: FLSmidth A/S

( * ) Notice: Subject to any disclaimer, the term of this patent is extended or adjusted under 35 U.S.C. 154(b) by 0 days.

(21) Appl. No.: 16/762,783

(22) PCT Filed: Nov. 7, 2018

(86) PCT No.: PCT/IB2018/058755
§ 371 (c)(1),
(2) Date: May 8, 2020

(87) PCT Pub. No.: WO2019/092620
PCT Pub. Date: May 16, 2019

(65) Prior Publication Data
US 2021/0187517 A1 Jun. 24, 2021

Related U.S. Application Data

(60) Provisional application No. 62/583,199, filed on Nov. 8, 2017.

(51) Int. Cl.
*B03D 1/02* (2006.01)
*B03D 1/16* (2006.01)
(Continued)

(52) U.S. Cl.
CPC ............... *B03D 1/22* (2013.01); *B03D 1/02* (2013.01); *B03D 1/20* (2013.01); *B03D 1/16* (2013.01)

(58) Field of Classification Search
CPC ... B03D 1/02; B03D 1/00; B03D 1/16; B03D 1/20; B03D 1/22
(Continued)

(56) References Cited

U.S. PATENT DOCUMENTS 3,442,539 A 5/1969 Randall
3,464,552 A 9/1969 Warman
(Continued)

FOREIGN PATENT DOCUMENTS

DE 202015100533 U1 4/2015
WO 20160147064 A2 9/2016

OTHER PUBLICATIONS

The International Search Report and Written Opinion dated Feb. 19, 2019, 12 pages.

*Primary Examiner* — Thomas M Lithgow
(74) *Attorney, Agent, or Firm* — Jeffrey A. Sharp

(57) ABSTRACT

The disclosure relates to an adapter (200) for converting a naturally-aspirated flotation cell (10) to a forced-gas flotation cell without replacing the naturally-aspirated flotation cell reducer (21) with a specialized conversion reducer (103). The adapter (200) is designed to be located below the naturally-aspirated flotation cell reducer (21) and at a location along the drive shaft. The adapter (200) comprises an outer static casing (201) having a forced gas inlet (210); an inner rotating spanner (204) having at least one port (205) therein; sealing means (203, 224, 225, 226) provided between the static casing (201) and the spanner (204); and, a chamber (213) formed between the outer static casing (201) and the spanner (204). Related methods and apparatus incorporating the adapter (200) are further disclosed.

27 Claims, 23 Drawing Sheets

(51) Int. Cl.
 *B03D 1/20* (2006.01)
 *B03D 1/22* (2006.01)
(58) Field of Classification Search
 USPC .................................................. 209/164, 169
 See application file for complete search history.

(56) References Cited

U.S. PATENT DOCUMENTS

| | | |
|---|---|---|
| 3,770,305 A | 11/1973 | Camosso |
| 2004/0130042 A1 | 7/2004 | Blakley et al. |
| 2014/0003188 A1* | 1/2014 | Harding ................. B03D 1/028 366/279 |

\* cited by examiner

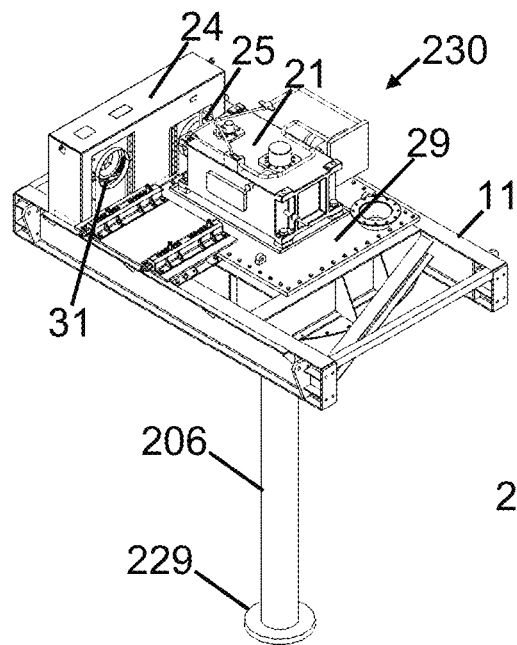
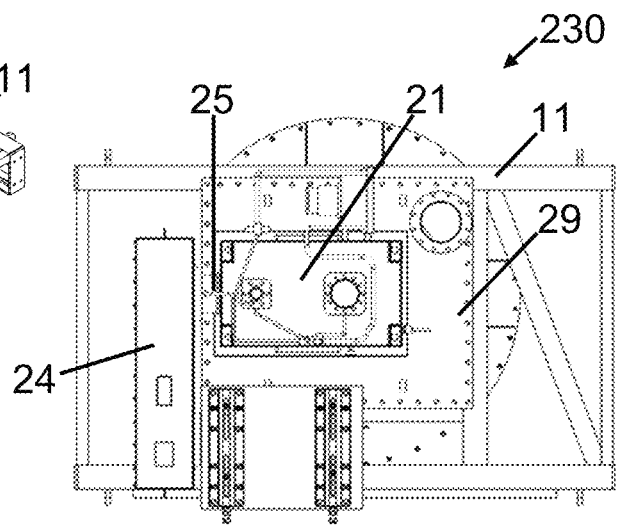
FIG. 12
FIG. 13
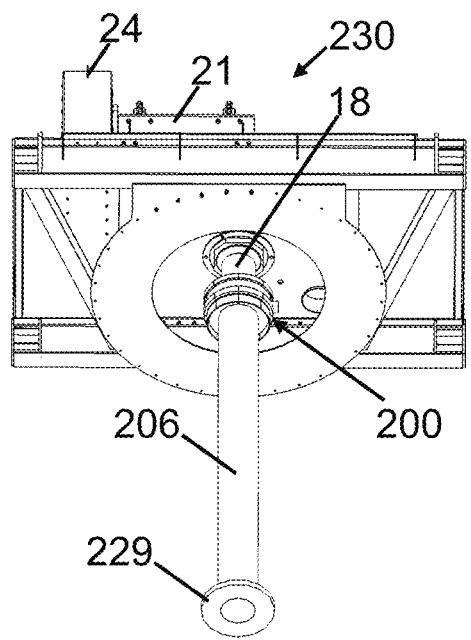
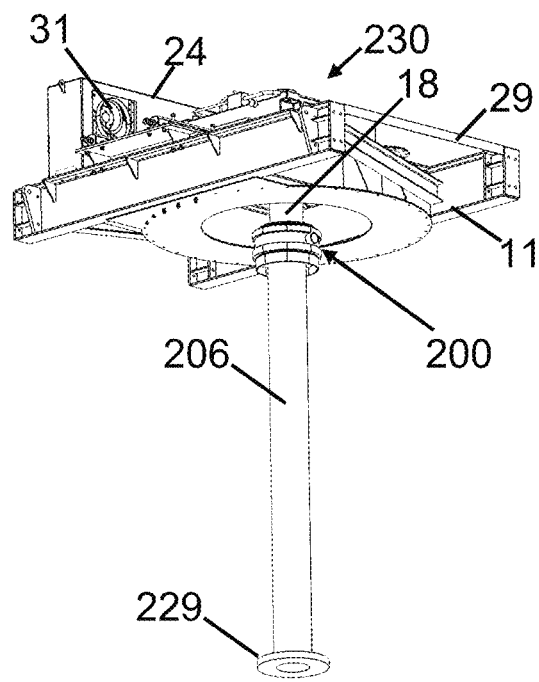
FIG. 14
FIG. 15

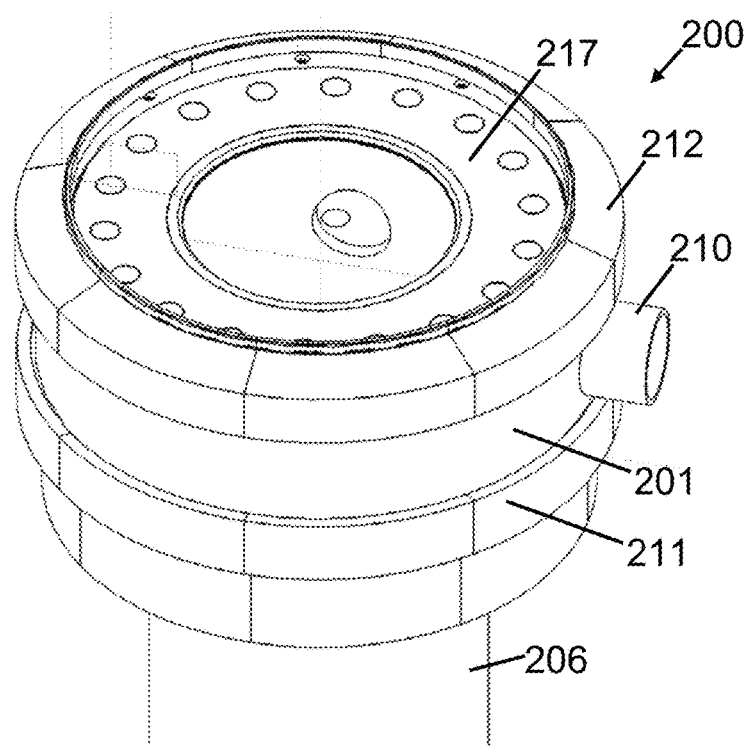
FIG. 22
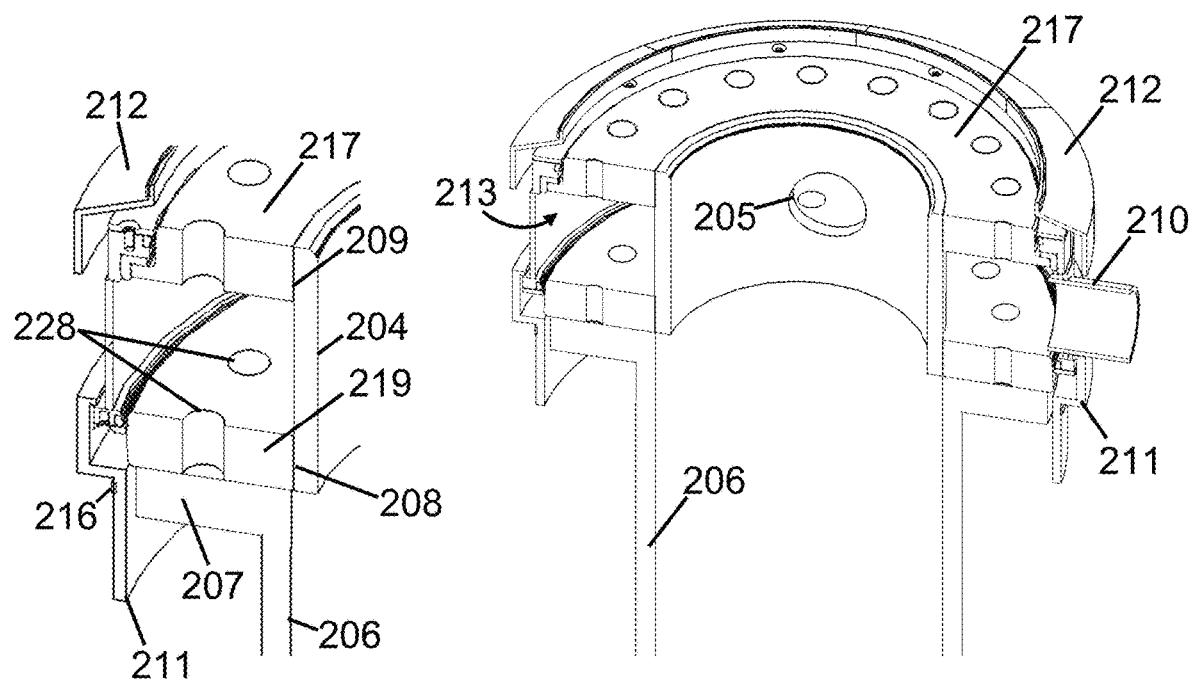
FIG. 23
FIG. 24

METHOD FOR CONVERTING A NATURALLY-ASPIRATED FLOTATION CELL TO A FORCED-GAS FLOTATION CELL, AND APPARATUS THEREOF

FIELD OF THE INVENTION

This application pertains to industrial flotation equipment applicable for use in the pulp and paper recycling, wastewater treatment, and mining (e.g., concentrator operations, ore dressing, and mineral processing) industries.

In particular, disclosed are novel methods and apparatus for converting a naturally-aspirated flotation cell (e.g., a WEMCO® flotation cell manufactured by FLSmidth) to a forced-gas flotation cell (e.g., a Dorr-Oliver® forced-air flotation cell manufactured by FLSmidth).

Flotation operations may realize an immediate benefit from practicing embodiments of the invention which are aimed towards improving flotation recovery and increasing flotation cell operating efficiency without significant capital expenditure and whilst maximizing the re-use of existing parts.

Operations having one or more naturally-aspirated flotation machines, or one or more banks of naturally-aspirated flotation machines may especially recognize advantages by employing the apparatus disclosed and/or by practicing the method steps disclosed herein.

BACKGROUND OF THE DISCLOSURE

Currently, ore bodies are concentrated through the use of a naturally-aspirated or forced-air flotation cells.

Naturally-aspirated cells are configured to introduce atmospheric air into the flotation cells. In some instances (e.g., with Denver Equipment Company flotation cells), a blower or "supercharger" may be employed to boost air input somewhat artificially.

Forced-air cells do not draw atmospheric air into a tank, but instead, use higher pressure pipelines which force air through a hollow rotating drive shaft and through holes in a rotor to facilitate bubble formation within a tank.

Flotation cells (whether naturally-aspirated or forced-air) may be daisy-chained, operated in parallel, operated in series, provided in banks, and/or may be of the flash, cleaner, rougher, or scavenger type, without limitation.

Recent advancements in forced-air flotation make forced-air flotation technology an attractive choice for many flotation operations. However, there are, to date, many thousands of naturally-aspirated cells still in operation. The high costs involved with completely removing a naturally-aspirated flotation cell from a flotation circuit or concentrator operation, procuring a new forced-air flotation cell, and shipping, installing, and commissioning the new forced-air flotation cell into the flotation circuit or concentrator operation (i.e., in place of the removed naturally-aspirated flotation cell) may be prohibitive—especially if doing so in large numbers.

Rather than completely removing a naturally-aspirated flotation cell 10 and replacing it entirely with a new substitute forced-air flotation cell 100, it may be possible to re-use the tank 1 of an existing naturally-aspirated flotation cell 10 and reconstruct its drive assembly to form a forced-air flotation cell using a retrofit kit. This may be accomplished by completely removing an existing naturally-aspirated flotation cell drive assembly 30 (i.e., including a naturally-aspirated flotation cell reducer 21 (e.g., a gearbox, pulley system, transmission, or the like), shaft 17, 18, and rotor 15), and then replacing it with one specially-configured for forced air flotation.

For example, a disperser 13, draft tube, and crowder 12 may be removed from a naturally-aspirated flotation cell 10, along with the naturally-aspirated flotation cell drive assembly 30—which includes a drive shaft 16, 18, a reducer 21, and a drive motor element 33 provided thereto. The removed naturally-aspirated flotation cell drive assembly 30 may be replaced, in its entirety, with a new replacement "forced-air"-capable drive assembly having a new motor 102, new reducer 103 (e.g., specialized conversion gearbox, pulley system, transmission, or the like), new shaft 118, 106 and new flotation rotor 120 on the shaft 118, 116.

A more economical choice to complete replacement of a naturally-aspirated flotation cell drive assembly 30 with one for forced air flotation involves replacing only those components of a naturally-aspirated flotation cell drive assembly 30 that need to be replaced for proper conversion to forced-air. For example, an existing naturally-aspirated drive motor 33 of a drive assembly 30 may be kept or may need alteration or replacing with one designed for forced-air. With all known retrofit units to date, it is currently absolutely necessary, at a very minimum, to replace a naturally-aspirated flotation cell reducer 21 with a new forced-air flotation cell reducer 103 in order to be able to plumb air to the hollow shaft as shown in FIGS. 2 and 3.

While still cheaper than completely removing and replacing a naturally-aspirated flotation cell with a new forced-air flotation cell, the cost to remove and replace a reducer for each naturally-aspirated flotation cell being converted/retrofitted with a new specialized forced-air drive assembly, can also become cost-prohibitive—especially when large in number.

Accordingly, there exists a long-felt need for technologies which could extend the useful lifespan, improve energy consumption, increase recovery rates, enhance performance, and/or increase the efficiency of industrial flotation equipment, without limitation—in particular, naturally-aspirated flotation cells (e.g., WEMCO® flotation machines), without limitation.

There also exists a need to minimize capital equipment expenditure (CAPEX) costs by: I.) maximizing the re-use of naturally-aspirated flotation cell drive assembly 30 parts during forced-air flotation cell conversion, II.) avoiding the complete removal and/or replacement of older naturally-aspirated flotation cells, and/or III.) avoiding the complete removal and/or replacement of older naturally-aspirated flotation cell drive assemblies 30 and/or reducers 21 during forced-air conversion. As will be discussed hereinafter, this may be accomplished through embodiments of the invention which involve retrofitting older/in-service naturally-aspirated flotation cells 10 with unique adapter assemblies 200 which conveniently and economically allow continued use of naturally-aspirated flotation cell reducers 21 during and after forced-gas conversion.

There further exists a need for flotation technologies which might improve plant operations and flotation process performance, provide for greater flexibility in plant design, refurbishment, and scheduled maintenance and overhaul planning.

The aim of this invention is to overcome the aforementioned problems, and to avoid necessarily having to replace or substantially modify a naturally-aspirated flotation cell reducer 21 during forced-gas conversion and retrofit.

OBJECTS OF THE INVENTION

It is, therefore, an object of the invention to enable an end user of a naturally-aspirated flotation cell to circumvent drawbacks (e.g., froth wave formation, inadequate recovery, lower efficiency, suboptimal performance), through conversion to a forced-air machine, via inexpensive and easy-to-use retrofit components.

It is a further object of the invention to enable an end user of a naturally-aspirated flotation cell to convert a naturally-aspirated flotation machine to a forced-air flotation machine, without necessarily requiring replacement of the entire naturally-aspirated drive assembly 30—thereby reducing conversion costs and keeping the conversion environmentally-friendly.

It is a further object of the invention to enable an end user of a naturally-aspirated flotation cell to convert a naturally-aspirated flotation machine to a forced-air flotation machine, without necessarily requiring replacement of the reducer 21—thereby reducing conversion costs and keeping the conversion environmentally-friendly.

This and other objects of the invention will be apparent from the drawings and description herein. Although every object of the invention is believed to be attained by at least one embodiment of the invention, there is not necessarily any one embodiment of the invention that achieves all of the objects of the invention.

BRIEF SUMMARY OF THE INVENTION

Disclosed, is a novel method for converting a naturally-aspirated flotation cell to a forced-air flotation cell. In some non-limiting embodiments, the method comprises the step of providing a drive assembly 30 for a naturally-aspirated flotation cell 10. The drive assembly 30 may have a naturally-aspirated flotation cell reducer 21 and a lower shaft 16 attached to (or at least configured to attach to) a naturally-aspirated flotation cell rotor 15. The lower shaft 16 may be configured to position the naturally-aspirated flotation cell rotor 15 in a central portion of a tank 1 of the naturally-aspirated flotation cell 10.

The method may further comprise the step of keeping the naturally-aspirated flotation cell reducer 21 with the provided drive assembly 30, thereby avoiding replacement of the naturally-aspirated flotation cell reducer 21 with a specialized conversion reducer 103. The method may further comprise the step of removing the lower shaft 16 from the drive assembly 30. The method may further comprise the step of providing an adapter 200 for the drive assembly 30. The adapter 200 may comprise an outer static casing 201 having a forced gas inlet 210. The adapter 200 may further comprise an inner rotating spanner 204 having at least one port 205 therein. The adapter may further comprise various sealing means 203, 224, 225, 226 provided between the static casing 201 and the spanner 204. The adapter 200 may further comprise a chamber 213 formed between the outer static casing 201 and the spanner 204, without limitation. The method may further comprise the step of connecting the adapter 200 to the drive assembly 30.

The step of connecting the adapter 200 to the drive assembly 30 may comprise connecting a mounting portion 23 of an upper shaft 18 to an upper inner spool 217 of the spanner 204, without limitation. The upper shaft 18 may be connected to the naturally-aspirated flotation cell reducer 21.

The method may comprise the step of connecting the adapter 200 to a lower shaft 206, wherein the lower shaft 206 is attached to, (or is at least configured to attach to) a forced gas flotation cell rotor 120, without limitation. In some embodiments, the step of connecting the adapter 200 to the lower shaft 206 may comprise connecting a mounting portion 207 of the lower shaft 206 to a lower inner spool 219 of the spanner 204, as shown in FIGS. 6 and 19, without limitation. In some embodiments, the mounting portion 207 may comprise a radially-extending flange as shown. In some embodiments, the method may further comprise the steps of: supplying gas to the chamber 213, via the forced gas inlet 210; and/or forcing gas in the chamber 213 through the at least one port 205, without limitation. It should be understood that in some alternative embodiments, such as the one suggested in FIGS. 28-36, a mounting portion 207 may be connected to the upper shaft 18, without limitation.

According to some embodiments, gas may be moved from the chamber 213 to the inside of a lower shaft 206 connected to the adapter 200, without limitation. The method may comprise providing a conduit 231 to the forced gas inlet 210 for supplying gas to the chamber 213, without limitation. A forced gas flotation cell rotor 120 may be attached to a lower shaft 206; wherein the forced gas flotation cell rotor 120 may have one or more blades 122 and one or more ports 121, without limitation. According to some embodiments, the method may include moving gas from the chamber 213 of the adapter 200, to the one or more ports 121 of the forced gas flotation cell rotor 120, without limitation.

The method may further comprise preventing gas in the chamber 213 or lower shaft 206 from entering the naturally-aspirated flotation cell reducer 21. This may be accomplished, for example, by virtue of providing a preferably solid (or hollow but sealed) upper shaft 18 between the adapter 200 and the naturally-aspirated flotation cell reducer 21, without limitation. While not illustrated, this may alternatively be accomplished by providing a hollow upper shaft 18 and a spanner 204 having a "capped" upper inner spool 217 which closes off the upper side of the spanner 204, without limitation. Alternatively, while not illustrated, those skilled in the art will also readily appreciate that this preventing of gas from entering the naturally-aspirated flotation cell reducer 21 may also be accomplished by providing a full bottom endcap on upper shaft 18 or mounting portion 23, regardless of whether or not the upper shaft 18 is solid or hollow but sealed, without limitation.

In some preferred embodiments, the naturally-aspirated flotation cell 10 comprises a tank 1 volume of at least 250 cubic meters, without limitation. The forced-gas flotation cell may comprise a forced-air flotation cell, and gas provided to the chamber 213 may comprise air (e.g., a combination of $N_2$, $O_2$, Ar, $CO_2$, and trace gases), a gas not normally found in air, and/or a combination thereof, without limitation.

According to some embodiments, a rotating upper flinger shroud 212 may be applied to the mounting portion 23 of the upper shaft 18. As shown, an upper clip 215 may be provided to fasten the rotating upper flinger shroud 212 to the mounting portion 23 of the upper shaft 18, without limitation. The method may further comprise the step of applying a rotating lower flinger shroud 211 to the mounting portion 207 of the lower shaft 206. The step of providing a lower clip 216 to fasten the rotating lower flinger shroud 211 to the mounting portion 207 of the lower shaft 206 may also be practiced according to some embodiments. It should be understood that in alternative embodiments, while not shown, the upper flinger shroud 212 may alternatively be connected directly to the upper shaft 18 or upper inner spool 217 (e.g., with geometric and/or scaling changes to components in the adapter from what is shown) without limitation. Similarly, it should also be understood that in alternative embodiments, while not shown, the lower flinger shroud 211 may alternatively be connected directly to the lower shaft 206 or lower inner spool 219, without limitation.

According to the method, an upper retainer 221 may be attached to an upper outer spool 202 to hold in place, a first annular seal 225 of said sealing means, such that the first annular seal 225 extends between the upper outer spool 202 and the upper inner spool 217 and closes a gap between the static casing 201 and the rotating spanner 204. Accordingly, the first annular seal 225 may help seal the chamber 213, without limitation. The method may similarly comprise the step of attaching a lower retainer 222 to a lower outer spool 220 to hold in place, a second annular seal 224 of said sealing means. The second annular seal 224 may extend between the lower outer spool 220 and the lower inner spool 219 to close a gap between the static casing 201 and the rotating spanner 204, and also to seal the chamber 213.

A third annular seal 226 of said sealing means may be provided to the adapter 200 as well, the third annular seal 226 extending between the upper outer spool 202 and the upper inner spool 217 to close a gap between the static casing 201 and the rotating spanner 204, seal the chamber 213, and further serve as an air bearing supporting the lower shaft 206 and rotor 120, without limitation. In some preferred embodiments, the third annular seal 226 may comprise polytetrafluoroethylene (PTFE).

According to some embodiments of the method, the steps of connecting the lower shaft 206 to the upper shaft 18 in two different places may be performed. This step may involve providing two mounting portions 207, and mounting them to the upper shaft 18, such that a portion of the hollow lower shaft 206 radially surrounds the upper shaft 18 thereby forming a chamber 213 therebetween as suggested in FIG. 34.

A forced-gas flotation cell manufactured from a naturally-aspirated flotation cell is also disclosed. The forced-gas flotation cell may be manufactured using the above method and may comprise portions of a drive assembly 30 from a naturally-aspirated flotation cell 10. The drive assembly 230 of the forced-gas flotation cell may retain a naturally-aspirated flotation cell reducer 21 from a drive assembly 30 of the naturally-aspirated flotation cell 10, but incorporate a new extended lower shaft 206 attached to or at least configured to attach to a forced-gas flotation cell rotor 120. The lower shaft 206 is preferably hollow and configured to position the forced-gas flotation cell rotor (20 adjacent a bottom portion of a tank 1 of the forced-gas flotation cell as compared to in a central portion of a tank 1 for the naturally-aspirated flotation cell 10.

The converted naturally-aspirated flotation cell 10 may be characterized in that the drive assembly 230 comprises a naturally-aspirated flotation cell reducer 21 of the naturally-aspirated flotation cell drive assembly 30, thereby avoiding replacement of the naturally-aspirated flotation cell reducer 21 with a specialized conversion reducer 103 for the forced air drive assembly 230. The forced-gas flotation cell may also be distinguished from known designs in that it may comprise an adapter 200 connected to the drive assembly 230, the adapter 200 comprising: an outer static casing 201 having a forced gas inlet 210; an inner rotating spanner 204 having at least one port 205 therein; sealing means 203, 224, 225, 226 provided between the static casing 201 and the spanner 204; and, a chamber 213 formed between the outer static casing 201 and the spanner 204, without limitation.

In some embodiments, a mounting portion 23 of an upper shaft 18 may be connected to an upper inner spool 217 of the spanner 204. In some embodiments, the upper shaft 18 may be connected to the naturally-aspirated flotation cell reducer 21. The adapter 200 may be connected to a lower shaft 206, wherein the lower shaft 206 may be attached to, or may at least be configured to attach to a forced gas flotation cell rotor 120, without limitation. The lower shaft 206 may be hollow to allow internal passage of air or gas to a rotor 120.

A mounting portion 207 of the lower shaft 206 may be connected to a lower inner spool 219 of the spanner 204. During operation, gas may be supplied to the chamber 213, via the forced gas inlet 210. Gas in the chamber 213 may be forced through the at least one port 205 and into the lower shaft 206, without limitation. Conduit 231 may be operatively connected to the forced gas inlet 210 for supplying gas to the chamber 213, without limitation.

In some non-limiting embodiments, a forced gas flotation cell rotor 120 may be attached to a lower shaft 206; the forced gas flotation cell rotor 120 having one or more blades 122 and one or more ports 121 configured to receive air from the chamber 213 of the adapter 200. In some non-limiting embodiments, gas in the chamber 213 or lower shaft 206 may be prevented from entering the naturally-aspirated flotation cell reducer 21 of the drive apparatus 230 by virtue of a solid (or hollow but sealed) upper shaft 18 provided between the adapter 200 and the naturally-aspirated flotation cell reducer 21. The naturally-aspirated flotation cell used to manufacture the forced-gas flotation cell may comprise a tank 1 volume of at least 250 cubic meters, without limitation. Accordingly, the forced gas flotation cell may further comprise a tank 1 volume of at least 250 cubic meters, without limitation. The forced-gas flotation cell may comprise a forced-air flotation cell, and the gas provided to the chamber 213 during operation may comprise air, without limitation.

The forced-gas flotation cell may, according to some embodiments, comprise a rotating upper flinger shroud 212 applied to a mounting portion 23 of the upper shaft 18. An upper clip 215 may be provided thereto, to fasten the rotating upper flinger shroud 212 to the mounting portion 23 of the upper shaft 18, without limitation. Similarly, a rotating lower flinger shroud 211 may be applied to a mounting portion 207 of the lower shaft 206. A lower clip 216 may be provided thereto, in order to fasten the rotating lower flinger shroud 211 to the mounting portion 207 of the lower shaft 206, without limitation. It should be understood that in alternative embodiments, while not shown, the upper flinger shroud 212 may alternatively be connected directly to the upper shaft 18 or to the upper inner spool 217 (e.g., with geometric and/or scaling changes to components in the adapter from what is shown) without limitation. Similarly, it should also be understood that in alternative embodiments, while not shown, the lower flinger shroud 211 may alternatively be connected directly to the lower shaft 206 or to the lower inner spool 219, without limitation.

An upper retainer 221 may be attached to an upper outer spool 202 to hold in place, a first annular seal 225 of said sealing means. The first annular seal 225 may extend between the upper outer spool 202 and the upper inner spool 217 to close a gap between the static casing 201 and the rotating spanner 204 and seal the chamber 213, without limitation. A lower retainer 222 may be attached to a lower outer spool 220 in order to hold in place, a second annular seal 224 of said sealing means. The second annular seal 224 may extend between the lower outer spool 220 and the lower inner spool 219 to close a gap between the static casing 201 and the rotating spanner 204 and seal the chamber 213, without limitation. A third annular seal 226 of said sealing means may extend between the upper outer spool 202 and the upper inner spool 217 to close a gap between the static casing 201 and the rotating spanner 204. The third annular seal 226 may serve as supplemental sealing means for the chamber 213, and/or may further serve as an air bearing supporting the lower shaft 206 and rotor 120, without limitation. According to some preferred embodiments, the third annular seal 226 may comprise polytetrafluoroethylene (PTFE) material, without limitation, and may be compose entirely of PTFE, without limitation.

In some embodiments, the forced-gas flotation cell may be configured such that the lower shaft 206 connects to the upper shaft 18 in two places, via two separate mounting portions 207 (as Suggested in FIG. 34), and so that a portion of the lower shaft 206 radially surrounds said upper shaft 18 thereby forming a chamber 213 therebetween, without limitation.

An adapter 200 configured for converting a naturally-aspirated flotation cell 10 to a forced-gas flotation cell without replacing the naturally-aspirated flotation cell reducer 21 with a specialized conversion reducer 103, is further disclosed. The adapter 200 may be used to retrofit existing naturally-aspirated flotation cell 10. According to some preferred embodiments, the adapter 200 may comprise an outer static casing 201 having a forced gas inlet 210, without limitation. The adapter 200 may further comprise an inner rotating spanner 204 having at least one port 205 therein, without limitation. The port 205 may be defined by an aperture or a cutout section of a tubular wall structure of the spanner 204 as shown. Alternatively, as suggested in FIGS. 29-31 and 35, the port 205 may be defined by one or more air passages provided through an upper inner spool 217, lower inner spool 219, and/or mounting portion 207, without limitation. The adapter 200 may further comprise sealing means 203, 224, 225, 226 provided between the static casing 201 and the spanner 204, without limitation. The adapter 200 may further comprise a chamber 213 formed between the outer static casing 201 and the spanner 204, without limitation. The adapter 200 may be configured to be positioned between a hollow lower shaft 206 and a preferably solid (or hollow but sealed) upper shaft 18. It should be appreciated that ports 205 may be provided to the spanner 204 in any number, manner, or fashion which allows gas to sufficiently pass from the chamber 213 (i.e., outside of the spanner 204 and inner spools 217, 219) to the inside of the spanner 204, to the inside of the lower shaft 206, and/or to a rotor 120 provided to the lower shaft 206, without limitation.

The lower shaft 206 may be operatively connected to (or at least configured to connect to) a forced-gas flotation cell rotor 120 comprising one or more ports 121 therein. The lower shaft 206 may be further configured to deliver gas from the chamber 213 to the one or more ports 121 in the rotor 120 (e.g., by virtue of being hollow, cannulated, or equivalent, without limitation). The (hollow) lower shaft 206 may be configured to position the forced-gas flotation cell rotor 120 adjacent a bottom portion of a tank 1 of the forced-gas flotation cell as compared to in a central portion of the tank 1 for the naturally-aspirated flotation cell 10. The upper shaft 18 may be operatively connected to the naturally-aspirated flotation cell reducer 21. The upper shaft 18 may be further configured to prevent air from escaping from the chamber 213 of the adapter 200, without limitation. For example, in some embodiments, the upper shaft 18 may be solid (or hollow but sealed on at least its bottom end), without limitation.

As shown, an upper inner spool 217 of the spanner 204 may be configured to connect to a mounting portion 23 of an upper shaft 18. Or, an upper inner spool 217 of the spanner 204 may be configured to connect to an output shaft, hub, or drive of the naturally-aspirated flotation cell reducer 21, without limitation. While not shown, upper inner spool 217 of the spanner 204 may connect to upper shaft 18, output shaft, hub, or drive directly or without the use of a mounting portion 23 (e.g., via a threaded connection, welding, clamp, or equivalent), without limitation. The adapter 200 may be adapted to connect to a lower shaft 206; wherein the lower shaft 206 may be attached to or at least be configured to attach to) a forced gas flotation cell rotor 120.

A lower inner spool 219 of the spanner 204 may be configured to connect to a mounting portion 207 of the lower shaft 206. Gas may be supplied to the chamber 213, via the forced gas inlet 210. Gas in the chamber 213 may, in use, be forced through the at least one port 205 and into a lower shaft 206 connected to the adapter 200, without limitation. The forced gas inlet 210 may be configured to receive a conduit 231 for supplying gas to the chamber 213. The chamber 213 may be adapted to hold pressure, for example, adapted to contain a pressurized gas such as air, without limitation. The adapter 200 may comprise a rotating upper flinger shroud 212, and the rotating upper flinger shroud 212 may be configured to be applied to a mounting portion 23 of an upper shaft 18. An upper clip 215 configured to fasten the rotating upper flinger shroud 212 to the mounting portion 23 of the upper shaft 18 may also be provided and installed.

A rotating lower flinger shroud 211 configured to be applied to a mounting portion 207 of a lower shaft 206 may be provided according to certain embodiments; wherein a lower clip 216 configured to fasten the rotating lower flinger shroud 211 to the mounting portion 207 of the lower shaft 206 may be provided and installed around the lower flinger shroud 211.

According to some embodiments, an upper retainer 221 may be attached to an upper outer spool 202 to hold in place, a first annular seal 225 of said sealing means. The first annular seal 225 may extend between the upper outer spool 202 and the upper inner spool 217 to close a gap between the static casing 201 and the rotating spanner 204 and seal the chamber 213.

The adapter 200 may comprise a lower retainer 222 attached to a lower outer spool 220 to hold in place, a second annular seal 224 of said sealing means. The second annular seal 224 may extend between the lower outer spool 220 and the lower inner spool 219 to close a gap between the static casing 201 and the rotating spanner 204 and seal the chamber 213.

The adapter 200 may further comprise a third annular seal 226 of said sealing means, the third annular seal 226 extending between the upper outer spool 202 and the upper inner spool 217 to close a gap between the static casing 201 and the rotating spanner 204. The third annular seal 226 may also help seal the chamber 213 and further serve as an "air bearing" to help support a lower shaft 206 and rotor 120 during operation. As gas/air fills the chamber 213, friction may decrease between components of the adapter 200 (e.g., friction may decrease between the upper outer spool 202 portion of the static casing 201 and the upper inner spool 217 portion of the spanner 204), without limitation. In some preferred embodiments, the third annular seal 226 may comprise polytetrafluoroethylene (PTFE), without limitation.

In some embodiments, the adapter 200 may be configured such that a lower shaft 206 can connect to an upper shaft 18 in two places, using two mounting portions 207. In this regard, a portion of the lower shaft 206 can radially surround said upper shaft 18 thereby forming a chamber 213 therebetween, without limitation.

BRIEF SUMMARY OF THE DRAWINGS

To complement the description which is being made, and for the purpose of aiding to better understand the features of the invention, a set of drawings illustrating new and novel methods and apparatus for converting naturally-aspirated flotation cells to forced-gas flotation cells is attached to the present specification as an integral part thereof, in which the following has been depicted with an illustrative and non-limiting character. It should be understood that like reference numbers used in the drawings (if any are used) may identify like components.

FIGS. 8-15 show various views of a drive assembly 230 according to some embodiments, the drive assembly 230 shown does not depict a rotor 120 or drive motor 33 for clarity.

FIGS. 19-25 show various detailed views of an adapter 200 according to some embodiments.

Figure 1:
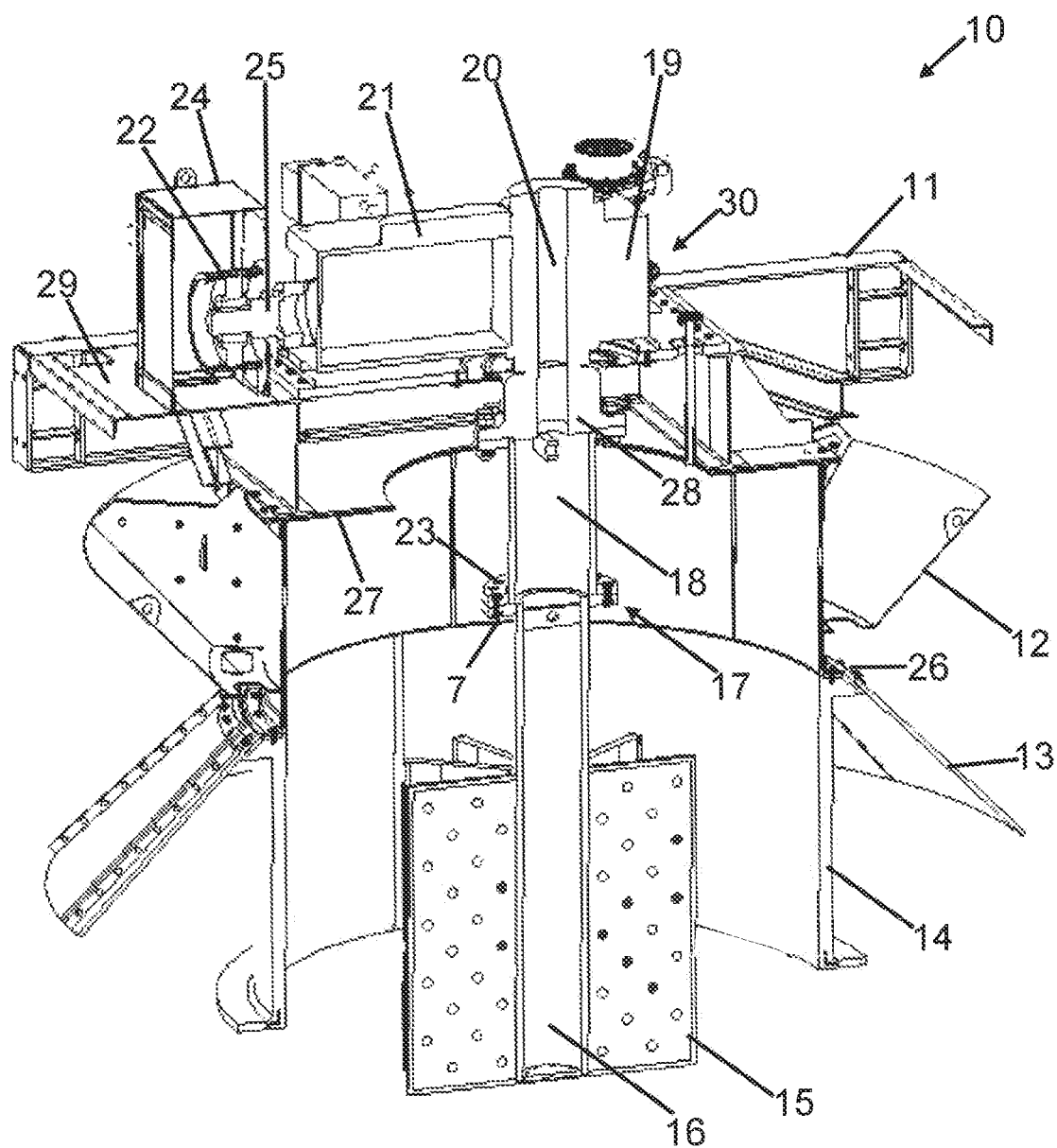
FIG. 1 illustrates an upper portion of a conventional naturally-aspirated flotation cell—mainly, a naturally aspirated drive assembly. The naturally-aspirated flotation cell may comprise a tank provided with: a naturally-aspirated drive motor (not shown), a naturally-aspirated reducer, a naturally-aspirated shaft, a naturally-aspirated rotor attached to the naturally-aspirated shaft, a disperser provided around the naturally-aspirated rotor, a disperser hood surrounding an upper portion of the disperser, a crowder, and a draft tube (e.g., a WEMCO® brand flotation machine). In the particular embodiment shown in FIG. 1, both a pulley drive reduction and gearbox/transmission are shown to be used as the reducer 21 in the drive assembly 30.

In the following, the invention will be described in more detail with reference to drawings in conjunction with exemplary embodiments.

DETAILED DESCRIPTION

While the present invention has been described herein using exemplary embodiments of a conversion method (i.e., a retrofit rebuild of a "naturally-aspirated" flotation cell apparatus and method of conversion to a "forced air" or "forced gas" flotation cell), it should be understood that numerous variations and adaptations will be apparent to those of ordinary skill in the field from the teachings provided herein.

The detailed embodiments shown and described in the text and figures should not be construed as limiting in scope; rather, all provided embodiments should be considered to be exemplary in nature. Accordingly, this invention is only limited by the appended claims.

The inventors have recognized a novel and heretofore unappreciated method of converting a flotation cell; in particular, a naturally-aspirated flotation cell (e.g., a WEMCO® flotation cell manufactured by FLSmidth), to a "forced-gas"-type specie, without necessarily requiring the removal and replacement of major drivetrain components such as drive motors 33, belt 32 drives, guards 24, pulleys 22, and reducers 21 (e.g., gear boxes, transmissions, drive trains).

This inventive technology may be applied to existing naturally-aspirated flotation field installations or may be rolled out to an existing global installed base, without limitation. In some embodiments, different parties or entities may each separately perform different steps or portions of steps of the methods described herein and such steps or portions of steps may relate to the decommissioning, removal of parts, sizing of parts, engineering of parts, ordering of parts, delivery of parts, installation of parts, and/or recommissioning of flotation cells, without limitation. Moreover, multiple different parties or entities may collaborate or collectively execute (e.g., simultaneously) different steps or portions of steps of methods used in the decommissioning, removal of parts, sizing of parts, engineering of parts, ordering of parts, delivery of parts, installation of parts, and/or recommissioning of flotation cells, without limitation.

Figure 2:
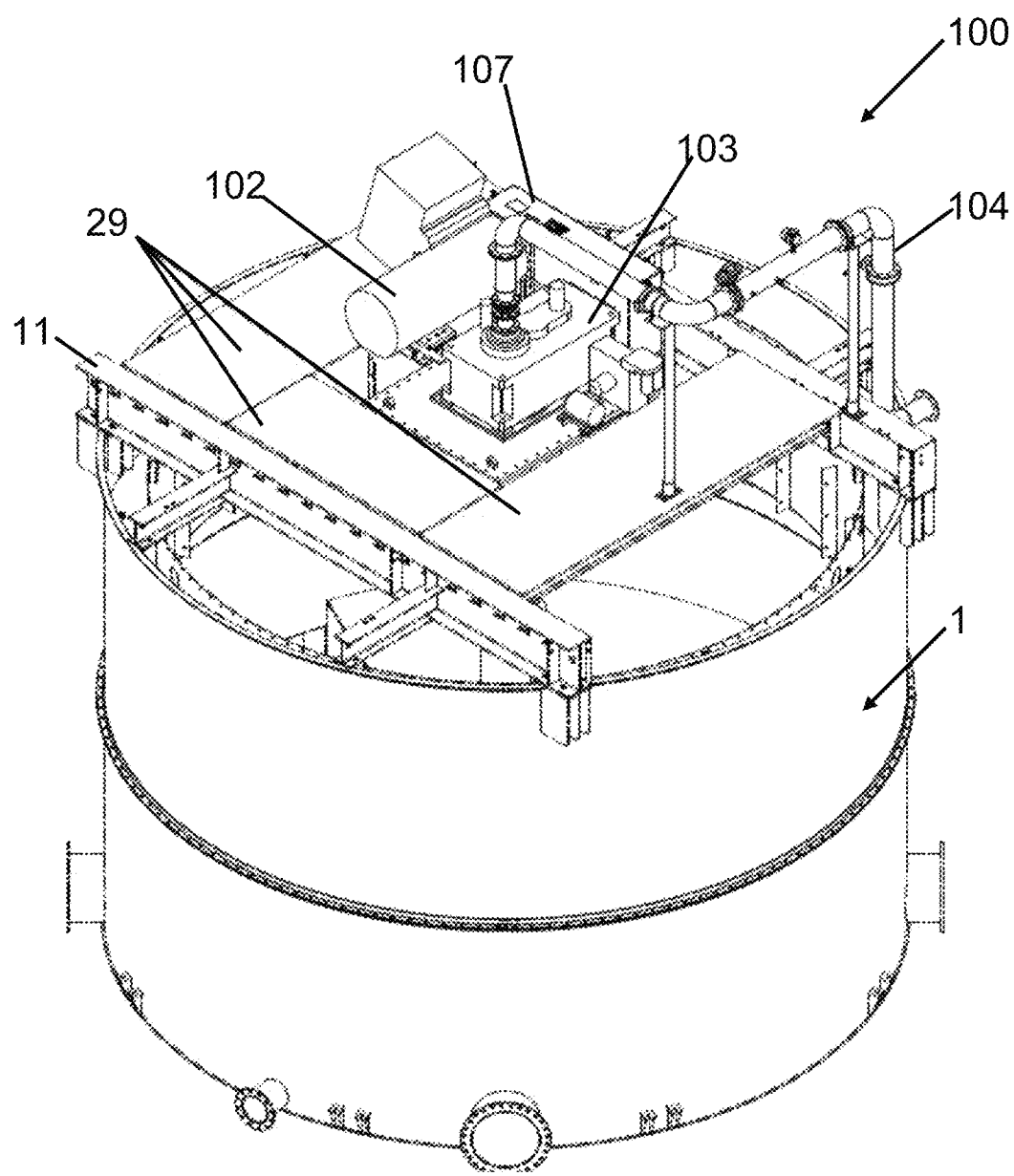
FIG. 2 illustrates a conventional naturally-aspirated flotation cell (e.g., such as the one shown in FIG. 1), which has been converted to a forced-gas flotation machine, according to some embodiments.
Figure 3:
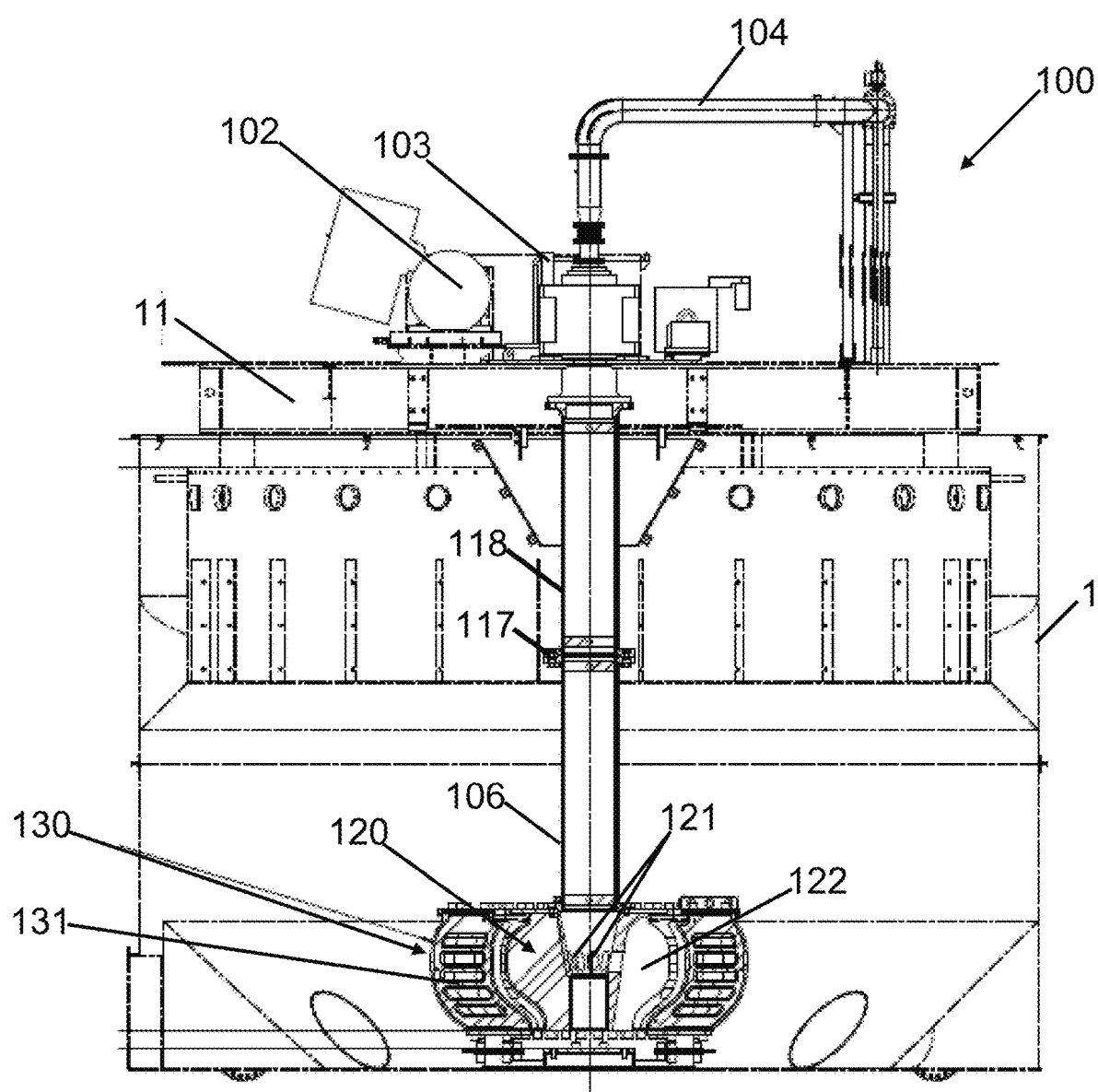
FIG. 3 illustrates a side cutaway view of the forced-gas conversion flotation machine shown and described in FIG. 2.
Figure 4:
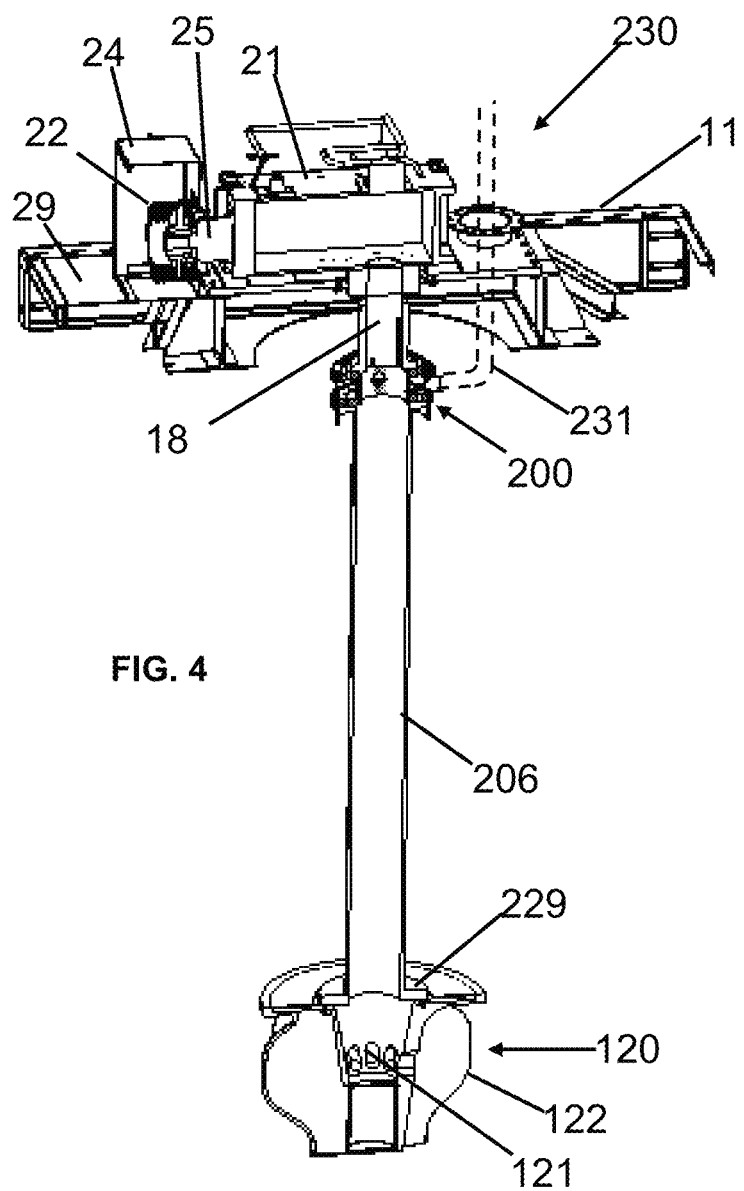
FIG. 4 illustrates an exemplary, non-limiting embodiment of a drive assembly which may be used to convert a naturally-aspirated flotation cell to a forced-gas flotation cell.

In preferred embodiments, the original naturally-aspirated drive motor 33 and at least the reducer 21 are kept with the original drive assembly 30 throughout the entire conversion to a forced-gas drive assembly 230; and are thus, not needed to be replaced with a substitute conversion motor 102 or expensive specialized reducer 103 as shown in prior art FIGS. 2 and 3. Instead, the drive assembly 30 of a naturally-aspirated flotation cell is preferably converted to a forced-air flotation cell drive assembly 230, via a special low-cost adapter 200, which is provided to the drive shaft well below/downstream of the drive train. As shown, the adapter 200 may be provided to a new lower shaft 206 and an upper 18 shaft, and may be provided between the two, without limitation. While not shown, it should be understood that the adapter 200 may be affixed directly to an output 28 of the naturally-aspirated reducer 21, without use of an upper shaft 18 therebetween.

Using the adapter 200 may help reduce conversion costs by avoiding the need for removing and disposing of otherwise working serviceable parts 21, as well as avoiding the need for procuring drive assembly 30 replacement parts (e.g., 103, 104, 107). In other words, required costs for labor, shipping, receiving, and installing new replacement parts may be mitigated by using the adapter 200 described herein.

Preferred embodiments advantageously reuse existing drive motors 33 and/or reducers 21 on drive assemblies 30 of naturally-aspirated flotation cells 10. In this regard, the costs to convert a naturally-aspirated flotation cell to a forced-air flotation cell can be reduced. By incorporating existing drive components into the retrofit, as much as 75% capital savings or more may be achievable. Moreover, lower maintenance requirements (due to improved access), and relatively high reliability can be achieved by practicing the inventive concepts described herein.

It is preferred that a converted drive assembly 230 according to some embodiments comprise a robust sealing arrangement configured for use in an arduous operating environments. It is also preferred that a converted drive assembly 230 according to some embodiments is configured to be able to operate without lubrication or with very little lubrication.

According to some non-limiting embodiments, a converted drive assembly 230 may operate under various parameters; for example, where torque is approximately 33 kNm, shaft speed is approximately 86 RPM, overturning moment is approximately 40 kNm, air flow is approximately 52 m3/min @ 2.0 Jg, upper limit air pressure is approximately 70 kPa, and expected design life may approach 30,000 hours or more, without limitation.

According to some non-limiting embodiments, one or more annular seals 226 for the drive assembly 230 may be selected from a low-friction material. The seals 226 may be, as illustrated, annular in shape and provided between an outer upper spool 202 and an inner upper spool 217, without limitation. The annular seals 226 may be configured as bearings, and may be selected to have both sealing and high lubricity properties. Each annular seal 226 may therefore serve as an annular seal to prevent air or gas from escaping from chamber 213. In addition to, or instead of acting to prevent air or gas from escaping chamber 213, the annular seal(s) 226 may serve to "float" downstream portions of the drivetrain on a cushion of air or gas from the chamber 213.

Annular sealing bearings 226 may be selected according to the following exemplary specifications, without limitation: a design PV of approximately 0.027 MPa×m/s, an allowable PV of approximately 35 MPa×m/s, a service factor of approximately 13, a design tip speed of approximately 2.4 m/s, and a published limiting tip speed of approximately 2 m/s; wherein it may be acceptable for tip speed to exceed limiting value with low loading conditions.

In some non-limiting embodiments, for example, a TEKSLIDE® G453 bearing may be employed as the annular seal 226. In some non-limiting embodiments, the bearing may comprise Guarniflon® PTFE G453 Polytetrafluoroethylene 25% Carbographite (PTFE G Standard Compound with carbon), without limitation.

The bearing preferably has good thermal and electrical conductivity properties, good resistance to deformation, excellent resistance to load, low coefficient of friction, high wear strength, and enhanced chemical resistance.

Turning now to prior art FIG. 1, a conventional naturally-aspirated flotation cell assembly 10 is shown. While its tank 1 is not visible in FIG. 1 (for clarity), the conventional naturally-aspirated flotation cell 10 generally comprises a drive assembly 30 having a structural frame 11 which may be provided with one or more upper floors or support plates 29 and/or one or more lower floors or support plates 27, without limitation. Connected via the frame 11 and floor(s) 27, 29 are a motor (not shown for clarity) having a drive pulley, a driven pulley 22 of a reducer 21 connected to the drive pulley 31 via a belt 22. The pulleys 22, 31 and belt 32 may be housed in a shroud 24, as shown, or may be left uncovered, without limitation. Of course, other forms of mechanical transfer may be employed between the motor and reducer 21—such as gears and sprockets connected by chains, without limitation.

The reducer 21 of the conventional naturally-aspirated flotation cell assembly 10 may comprise a breather or air intake 20. The output 28 of the reducer 21 may turn an upper shaft 18 which may be connected to a lower shaft 16 via a joint or other connection 17 (e.g., a flanged connection involving respective upper 23 and lower 7 mounting portions, without limitation). The reducer 21 may comprise a gearbox, pulley system, transmission, or the like, without limitation.

As part of the conversion/retrofit process, a froth crowder 12, hood 13, and disperser 14 may be removed from the naturally-aspirated flotation cell 10 to gain access to a lower part of the drive assembly 30. One or more bolted connections 26 securing the hood 13 to the disperser 14 may be undone. Next, a rotor 15 attached to a lower shaft 16 may be removed from the drive assembly 30 (e.g., by uncoupling the upper shaft 18 from the lower shaft 16 at their connection), without limitation.

The reducer 21, along with its internal gearing 19, its input shaft 25, its output 28, and any bearings provided adjacent the output 28 may remain intact with the drive assembly 30, wherein the lower shaft 16 and rotor 15 (and optionally the upper shaft 18) may be removed from the drive assembly 30, without limitation.

Turning now to prior art FIGS. 2 and 3, according to some non-limiting embodiments, a conventional naturally-aspirated flotation cell 10 may be converted to a converted forced-air flotation cell assembly 100 by altering the naturally-aspirated drive assembly 30 to create a converted forced-air flotation cell assembly 100, but only by first necessarily replacing the naturally-aspirated reducer 21 with a specialized conversion reducer 103 (e.g., a specialized gearbox or transmission). The original naturally-aspirated motor 33 may also need to be removed and replaced with one 102 designed for use with the specialized conversion reducer 103. The original naturally-aspirated shroud 24 may also need to be removed and replaced with one 107 designed for use with the specialized conversion reducer 103.

Air may be fed directly into the specialized conversion reducer 103 by virtue of an external conversion conduit 104 which is located above the lower and/or upper floors 27, 29 of the drive assembly 30, and well-above shaft portions 118, 106 of the conversion 100 without limitation. FIG. 3 clearly shows air being introduced to an upper portion of the specialized conversion reducer 103—well upstream of a hollow conversion upper shaft 118, which may be connected to a hollow conversion lower shaft 106 via a connection 117, without limitation. A conversion rotor 120 having blades 122 and ports 121 may be provided to the conversion's lower shaft 106 as shown. Final assembly of the converted forced-air flotation cell 100 may include a stator having a number of blades 131 surrounding the conversion rotor 120 as shown. The conversion rotor 120 and stator 130 are preferably located towards the bottom of the tank 1 as shown.

According to some embodiments, as suggested in FIGS. 4-25, an adapter 200 may be made especially for the conversion of large naturally-aspirated flotation cells 10 (e.g., those having tanks 1 greater than approximately 250 cubic meters) and/or those naturally-aspirated flotation cells 10 which might employ a geared/transmission-type reducer 21 alone or in combination with a pulley drive. This adapter 200 may be configured to be sealed so that it need not be serviced by periodic lubrication. Moreover, this adapter 200 may be configured to be located above or below a slurry/pulp/froth level, without limitation.

Turning now to FIGS. 4, 6, and 8-25, a naturally-aspirated flotation cell 10 may be converted to a forced-gas flotation cell easily and economically, by providing an adapter 200, a forced-gas rotor 120, and one or more shaft sections 206, 18 to the drive assembly 30 to form a novel and heretofore unappreciated conversion drive assembly 230.

The conversion drive assembly 230, according to some embodiments, may include an extended lower shaft 206, which allows a large portion of the existing naturally-aspirated drive assembly 30 and many mechanisms of an existing naturally-aspirated drive assembly 30 to remain intact, and this also substantially reduces the amount of cost of labor, materials, and time required for conversion/retrofit.

As shown, embodiments of a converted drive assembly 230 preferably incorporate Dorr Oliver fatigue criteria, or are otherwise designed for standard fatigue criteria for a forced-air flotation machine, rather than a naturally-aspirated flotation machine 10. A small diameter spanner 204 may be provided to the adapter 200 to simplify mating with the existing naturally-aspirated reducer 21 and/or to an upper shaft 18. The spanner 204 may be further configured to allow clearance for air/gas flow to the lower shaft 206, without limitation. For example, a DN350 schedule 100 spanner 204 may be employed, without limitation; and, an at-weld design stress of 21 MPa may be employed, without limitation. Spanner 204 may be operatively connected to connection means (e.g., upper inner spool 217 and lower inner spool 219), for example, via pressing, welding, threading or gluing the spanner 204 at respective upper 209 and lower 208 junctions or interfaces. The lower shaft 206 may comprise means for mounting a forced-gas rotor 120 designed for forced-gas applications. The means for mounting may, for example, comprise a rotor mount 290 such as a flange, threaded connection, bolted connection, or the like, without limitation.

The adapter 200 may comprise means for air ingress (e.g., a single hole or port, or dual air inlet holes may be employed). As shown, the adapter 200 may comprise a static casing 201 having at least one forced air inlet 210. The at least one forced air inlet 210 may be configured to connect to conduit 231 (see FIGS. 4 and 6). Inside static casing 201, a spanner 204 having one or more ports 204 therein may be configured rotate with lower shaft 206 and output 28 of the reducer 21, as well as an optional upper shaft 18. A preferably pressurizable chamber 213 may be formed between portions of the static casing 201 and rotating spanner 204.

Sealing means may be provided between the static casing 201 and the spanner 204. For example, an upper annular seal 225 may be provided between an upper outer spool 202 of the static casing 201 and an upper inner spool 217 of the spanner 204, without limitation. Moreover, a lower seal 224 may be provided between a lower outer spool 220 of the static casing 201 and a lower inner spool 219 of the spanner 204, without limitation. Portions of the upper inner spool 217 may be connected to an upper shaft 18 component thereof, such as a mounting portion 23 provided thereto. Or, while not shown, it is possible for the upper inner spool 217 to be coupled directly to the output 28 of the naturally-aspirated reducer 21, without limitation.

Each seal 224, 225 may comprise a body portion (e.g., a tapered body having a generally trapezoidal cross section), and one or more flexible legs as shown. The seals 224, 225 may be annular and their flexible legs, while shown to be radially-inwardly extending from the body portion, may alternatively extend radially outwardly or both radially inwardly and radially outwardly, without limitation.

A rotating upper flinger shroud 212 may be fastened directly to upper shaft 18 or to a mounting portion 23 thereof as shown. Securement of the rotating upper flinger shroud 212 may be done using an upper clip 215, for example, a circular retainer clip or the like as shown, without limitation. A rotating lower flinger shroud 211 may be fastened directly to lower shaft 206 or to a mounting portion 207 thereof as shown. Securement of the rotating lower flinger shroud 211 may be done using a lower clip 216, for example, a circular retainer clip or the like as shown, without limitation.

Figure 20:
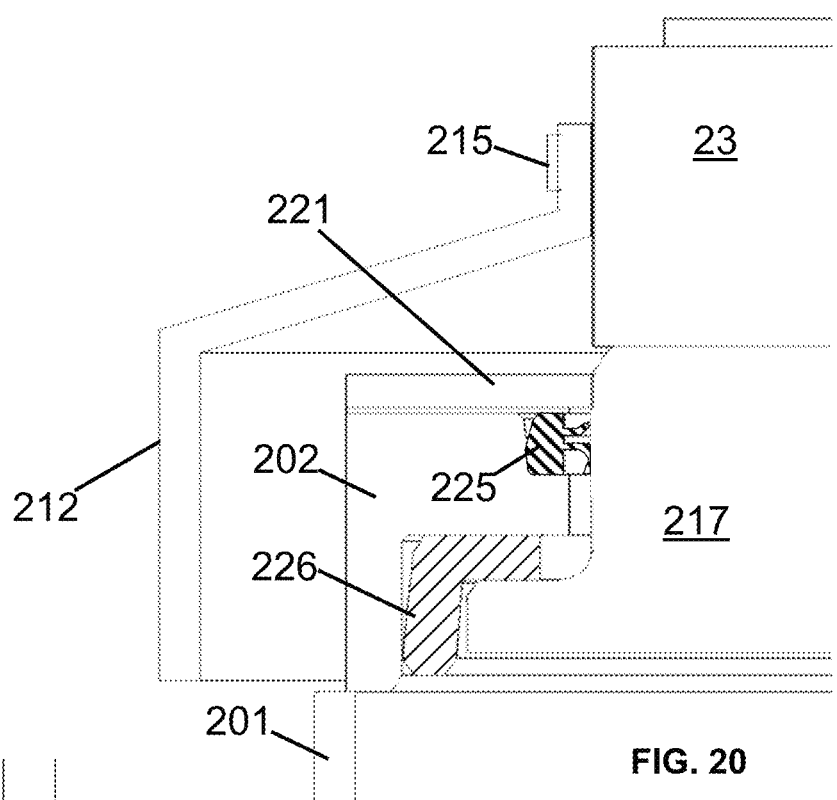

An upper retainer 221 may be fixed to the upper outer spool 202 to capture the upper seal 225 as shown in FIG. 20. However, other practical and substantially-equivalent retaining methods are envisaged. For example, the upper retainer 221 and upper outer spool 217 may be monolithic or provided in one piece, and the upper seal 225 may rest in an annular groove extending radially outwardly into the inner diameter surface of the upper outer spool 202, without limitation. Or, the upper seal 225 may rest in an annular groove extending radially inwardly into an outer diameter surface of the upper inner spool 217, without limitation.

Figure 21:
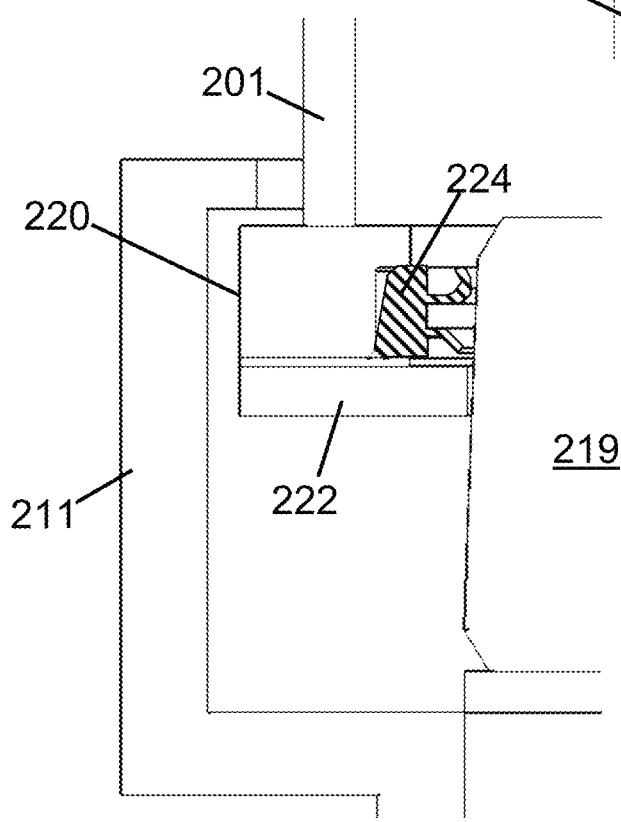
Figure 25:
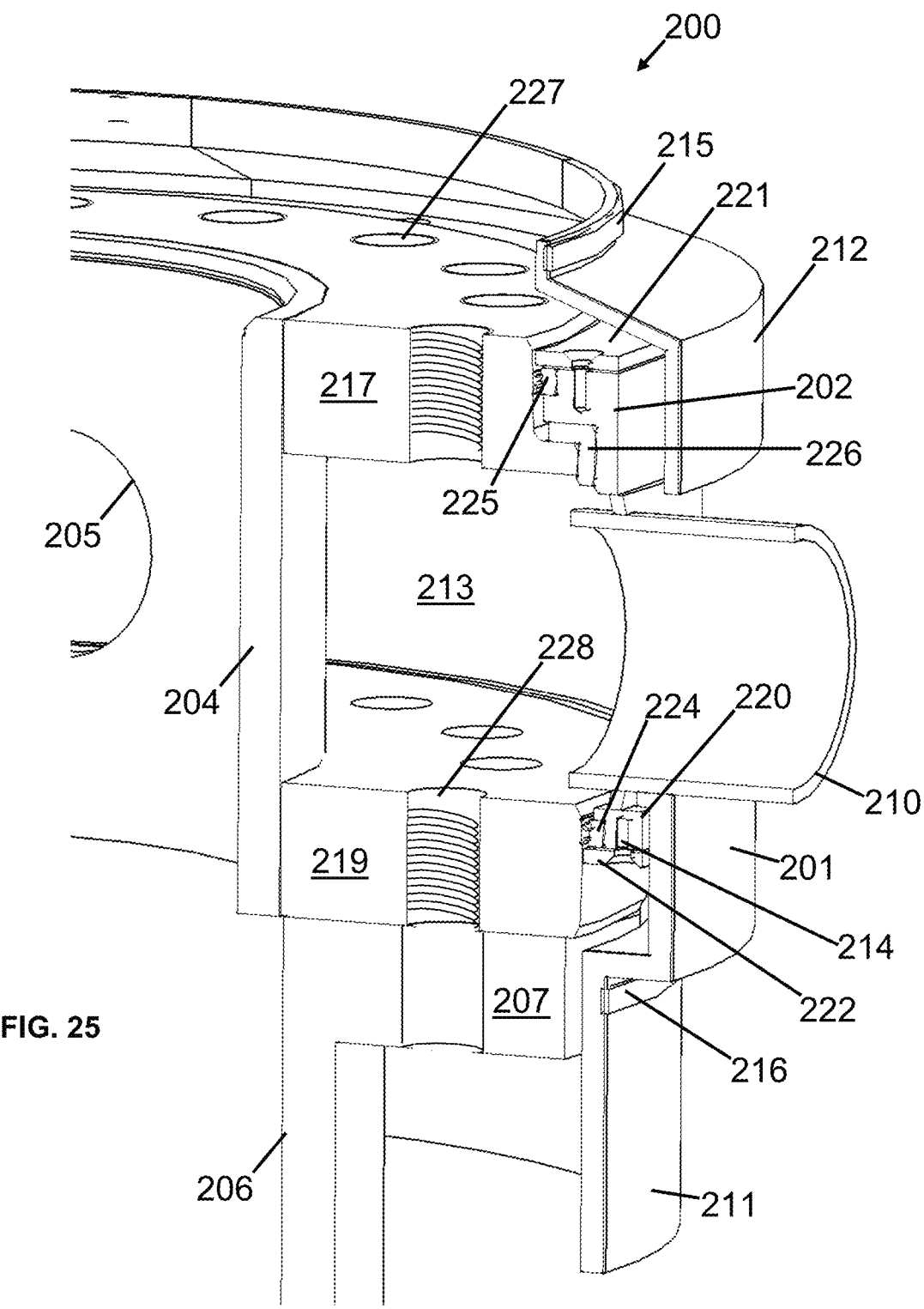

A lower retainer 222 may be fixed to the lower outer spool 220 to capture the lower seal 224 as shown in FIG. 21. However, other practical and substantially-equivalent retaining methods are envisaged. For example, the lower retainer 222 and lower outer spool 219 may be monolithic or provided in one piece, and the lower seal 224 may rest in an annular groove extending radially outwardly into the lower outer spool 220 and being located on the internal diameter surface of the lower outer spool 220, without limitation. Or, the lower seal 224 may rest in an annular groove extending radially inwardly into an outer diameter surface of the upper inner spool 219, without limitation.

Another annular seal 226 may further be provided between the upper outer spool 202 and the upper inner spool 217, without limitation. As shown, the annular seal 226 may be "L-shaped" in cross-section and may be configured to fit within an "L-shaped" recess formed between the upper outer spool 202 and the upper inner spool 217. The annular seal 226 may serve as a bearing between moving/rotating components (e.g., an "air bearing"), and is preferably made of a low-friction material (e.g., PTFE), without limitation, so that it may not need lubrication or frequent servicing; and/or, so that the adapter 200 may be adequately sealed for slight submersible use and operation within slurry, pulp, or froth. In preferred embodiments, annular seal 226 may serve as an "air bearing" helping to support lower portions of the drive assembly 230 on a cushion of air or gas in chamber 213. In use, when gas (e.g., compressed air) fills the chamber 213 of the adapter 200, and when spanner 204 is spinning within the static casing 201, the annular seal's 226 bearing properties may encourage the formation of low-friction air spaces/gaps between the upper outer spool 202 of the static casing 201 and the upper inner spool 217 of the spanner 204 (e.g., between the seal 226 and one of the upper outer spool 202 and upper inner spool 217), without limitation.

Figure 5:
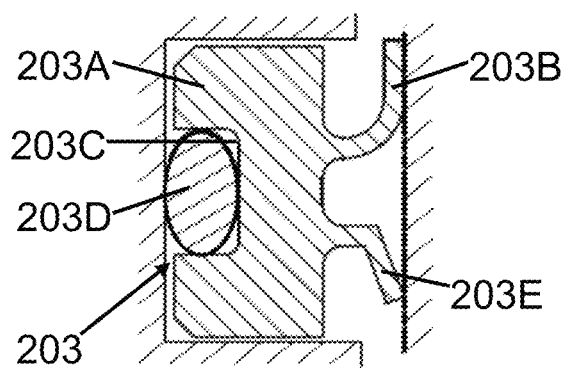
FIG. 5 illustrates an exemplary, non-limiting embodiment of a forced-air adapter which may be employed in a drive assembly and used to convert a naturally-aspirated flotation cell to a forced-gas flotation cell.

In some embodiments, the upper seal 225, lower seal 224, and/or annular seal 226 may comprise multiple components or may be modular as suggested in FIG. 5, without limitation. For example, a seal 203 described herein may comprise a seal body 203A having therein, a seal annular groove 203C, a seal first leg 203B, and an optional seal second leg 203E. A seal ring 203D may be placed in the seal annular groove 203C to make a seal 203, 224, 225, 226 modular, more serviceable, better performing, or the like, without limitation.

A first fastener portion 214 (e.g., an externally-threaded bolt) may be used in conjunction with a lower second fastener portion 228 (e.g., an internally-threaded bore) to connect spanner 204 to the lower shaft 206, without limitation. The first fastener portion 214 may be used in conjunction with an upper second fastener portion 227 to connect the spanner 204 to an upper shaft 18 and/or mounting portion 23 provided thereto, without limitation.

Mounting portion 23 may be integral with upper shaft 18, or it may be a separate component from the upper shaft 18, without limitation. Mounting portion 23 may comprise a flange with holes therethrough, without limitation, and may be configured to attach to another complimentary flange via a number of fasteners. Mounting portion 23 may have an open inner diameter as suggested in FIGS. 6 and 19, or it may have a closed end cap to cover a bottom of the upper shaft 18 (as suggested in FIGS. 27, 29, 34, and 36), without limitation.

Seal structures according to some non-limiting embodiments may be employed to keep non-gas fluids out of the lower shaft 206, chamber 213, conduit 231, and reducer 21, without limitation. Taking into consideration predicted tip speed of rotor 120, temperature (e.g., friction-induced), and pressure retention requirements, as well as a strong need to avoid lubrication, polytetrafluoroethylene (PTFE) seals 203, 224, 225, 226 may be preferred, without limitation. For example, pressure retention requirements or chemical limitations may exclude use of split seals, polymeric seals, or rubber seals. For example, in some non-limiting exemplary embodiments, a Parker® Flexlip® seal may be selected, fitted, or otherwise employed with the conversion of a naturally-aspirated flotation cell conversion to forced-air and provided as one or more of the seals 203, 224, 225, 226 or sealing means components described herein. This particular example of a seal includes an extrusion lip which may help reduce contaminant ingress. Preferably, the wear life of the seal provided should exceed 30,000 hours and should be fairly inexpensive (e.g., @<$300 USD per piece), without limitation.

According to some embodiments, grease may be included in the retrofit system (e.g., provided to and/or between moving components of the converted drive assembly 230), especially in instances where a naturally-aspirated flotation cell may be provided with a full loss lubrication system design. The volume of grease added during the retrofit process may be very small when compared to throughput (AW/DL). However, in any event, grease may be provided and/or utilized during retrofitting/conversion of a naturally-aspirated flotation cell 10, depending on the retrofit system design and whether or not such design is readily adapted or configured to accommodate grease.

According to some embodiments, a seal "counter-face treatment" may be employed to adjacent or juxtaposed component surfaces, without limitation. This seal counter-face treatment may, for example, increase hardness, lubricity, and/or corrosion protection, without limitation. For example, surface treatments including, but not limited to chrome, nickel, or bronze plating, inclusion of a sleeve, PTFE counter-face sleeve used with a PTFE sleeve, case hardening, diffusion hardening, lubricant impregnation, a combination thereof, and/or the like, may be employed. In this regard, surfaces around, adjacent, and/or configured to touch seals 203, 224, 225, 226 may have a smaller coefficient of friction, may possess higher lubricity, and/or may be harder than other surfaces of components within the adapter 200 or drive assembly 230, without limitation.

According to some non-limiting embodiments, a shrouding/flinger arrangement may be employed and an additional labyrinth may be employed on a static portion, rather than on a lip portion. Doing so may better encourage discharge of contaminants, without limitation.

According to some non-limiting embodiments, a spray water arrangement may be employed with a retrofit kit in order to intermittently purge contaminants that may settle/build up in or around the adapter 200 or drive assembly 230 components.

According to some non-limiting embodiments, cooling water may be used to improve the life of seals 203, 224, 225, 226 and/or bearings 226, without limitation.

According to some non-limiting embodiments, flingers 211, 212 may be provided in a single piece with a split (e.g., clamshell design) in order to improve fitment and fit up, without limitation. Or, flingers 211, 212 may be continuous annular devices, without limitation. Alternatively, flingers 211, 212 may assembled together from a number of modular wedge-shaped segments, without limitation.

According to some non-limiting embodiments, pneumatic piping and/or fittings may be provided and employed with conduit 231 (e.g., pipe arrangement(s) may be added to a naturally-aspirated flotation cell 30 as part of the conversion to forced-gas). In some embodiments, such a pipe arrangement may dually serve as a torque restraint. In some embodiments, conduit 231, inlet 210, and/or chamber 213 may be provided with or fitted with one or more sensors or gauges for operatively communicating with a processor and controller. In some embodiments, fluid system components of the converted drive assembly 230 may be configured to auto-detect early failure of one or more drive assembly 230 components, based on one or more changes in operating parameters while running. For example, potential or actual failures due to wear of certain components within a drive assembly 230 may be detected or otherwise recognized via an air pressure drop and/or an air flow change within the conduit 231, chamber 213, inlet 210, or other pipe arrangement(s). Detection may involve measuring pressure drops and/or airflow changes and raising alarm if they exceed a warning threshold and/or are within a "warning range" of values. Such a system, if imposed, may obviously require estimates of fluid losses which might occur across the various different seals 203, 224, 225, 226 or bearings 226 over time, during normal operation, and/or at various failure levels. In this regard, indicated alarm(s) may occur when losses exceed estimated thresholds or operating ranges which have already taken into consideration normal component wear over time.

According to some non-limiting embodiments, while not shown, a lower annular seal (similar to upper annular seal 226) may be employed for additional radial restraint, to minimize moment loading on the upper annular seal 226, and/or to stop any "wobbling" of the static casing 201, without limitation. More bearings may help reduce play within an adapter 200 during flotation cell operation.

According to some non-limiting embodiments, a plastic static casing 201 may be employed, and such a plastic casing may be manufactured through various means and methods known in the art, including, but not limited to roto-molding techniques. This may simplify the housing of the adapter 200, improve tolerances for better sealing and air-tightness of chamber 231, and perhaps remove or mitigate risks of corrosion, without limitation.

Imbalances between upper and lower casing endplates may be required in order to facilitate assembly of the drive assembly to a tank 1 of a naturally-aspirated flotation cell 10. This means that there may be a net "uplift" due to internal air pressures after the forced-air conversion which are not associated with a naturally-aspirated flotation cell design. Accordingly, in some embodiments, the mass of a housing or component (if/wherever employed) may be increased to overcome this potentially problematic issue of uplift. Alternatively to the aforementioned, uplifting forces due to air pressure in chamber 213 may be advantageously harnessed to remove loads placed on bearings seal(s) 226 of the drive assembly. This may require the addition of a vertically-oriented restraint mechanism, spring system, or dampening system to prevent too much movement of the housing or drive assembly components. Such systems are not shown for clarity.

Embodiments of methods of retrofitting, and retrofit components, alike, preferably follow good design practices and account for problems which are likely to occur in the field during use. Embodiments of methods of retrofit, and retrofit components alike, also preferably mitigate the risks associated with contamination which might occur in flotation equipment and/or flotation operations.

Converted units may be tested and the test data may be associated with units that have been successfully converted from naturally-aspirated to forced-gas. Relevant data may be recorded, logged, stored, and delivered to clients/customers who are (or may be) interested in purchasing such a retrofit system. Data may also be recorded, logged, stored, and delivered to clients/customers who are (or may be) interested in performing or requesting retrofitting services, without limitation.

Figure 6:
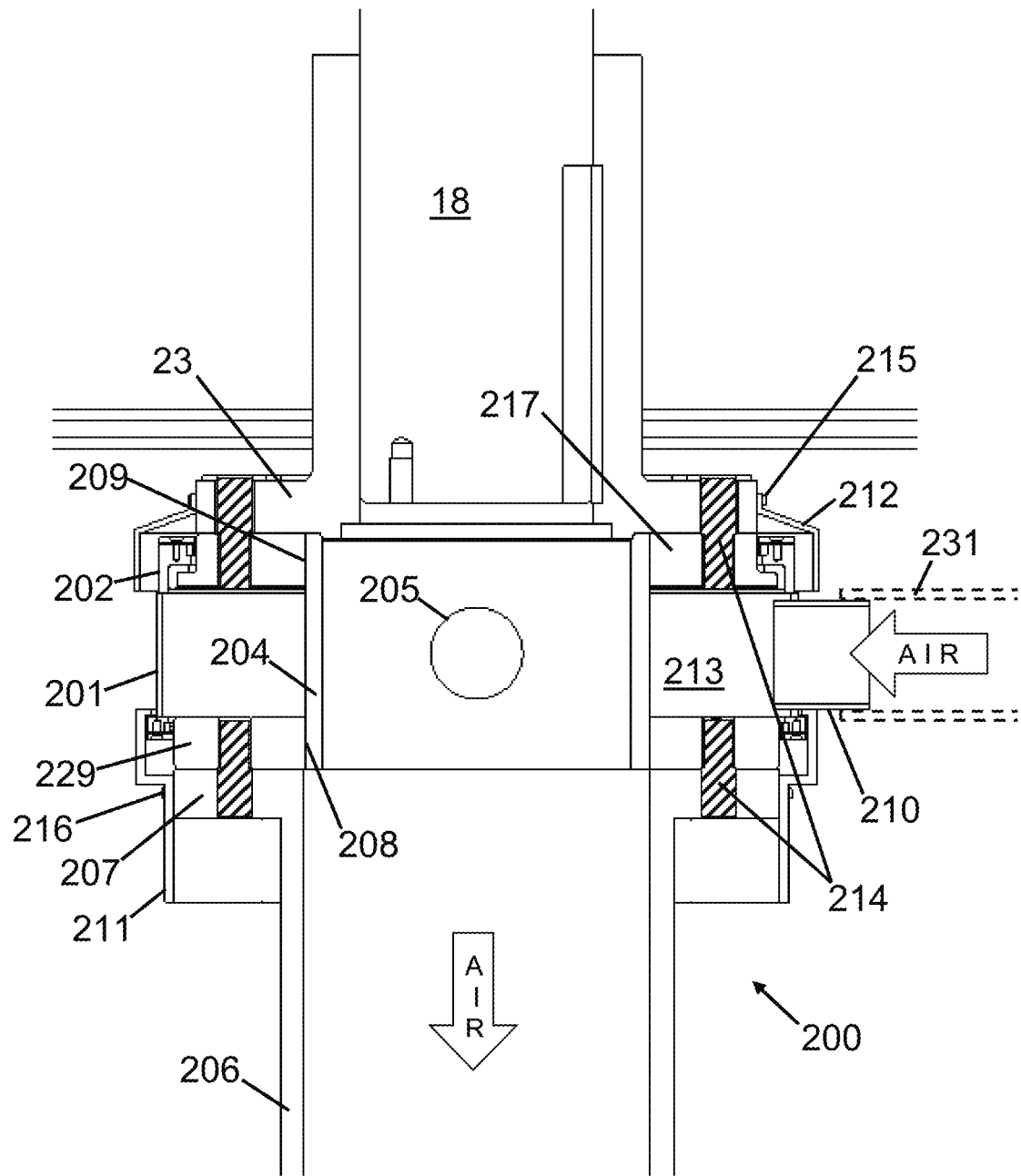
FIG. 6 illustrates a non-limiting embodiment of a multi-piece seal which may be employed in a drive assembly of a forced-gas flotation cell that has been converted from a naturally-aspirated flotation cell.
Figure 7:
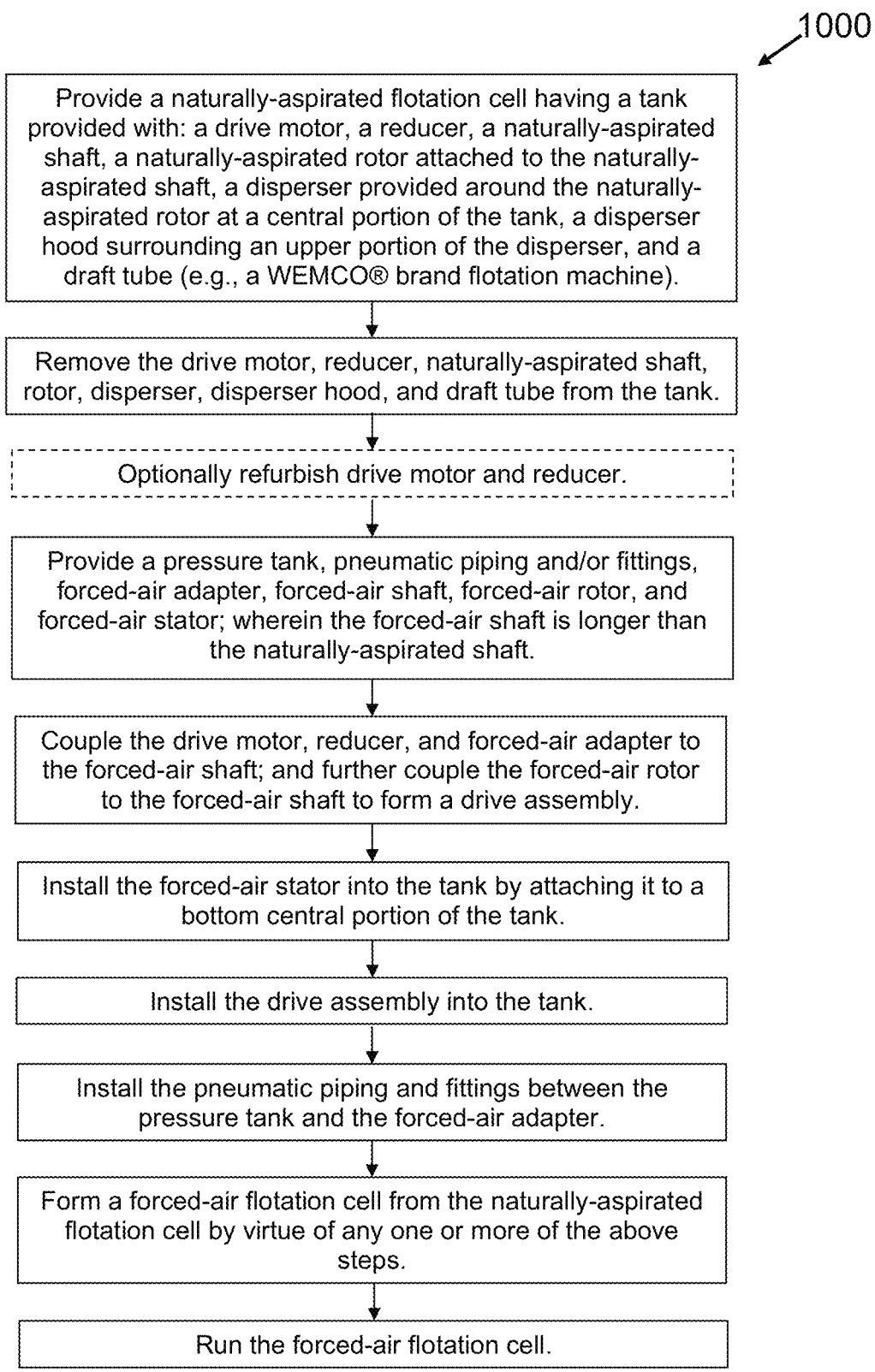
FIG. 7 illustrates an exemplary, non-limiting embodiment of a method of converting a naturally-aspirated flotation cell to a forced-gas flotation cell.
Figure 8:
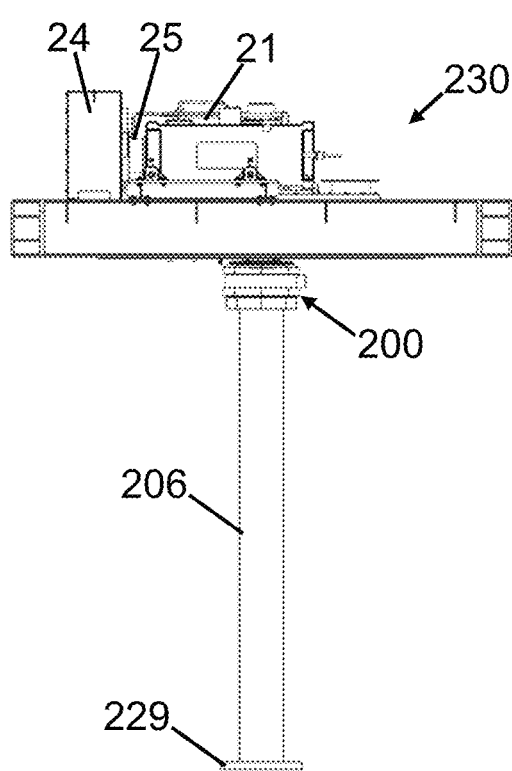
Figure 9:
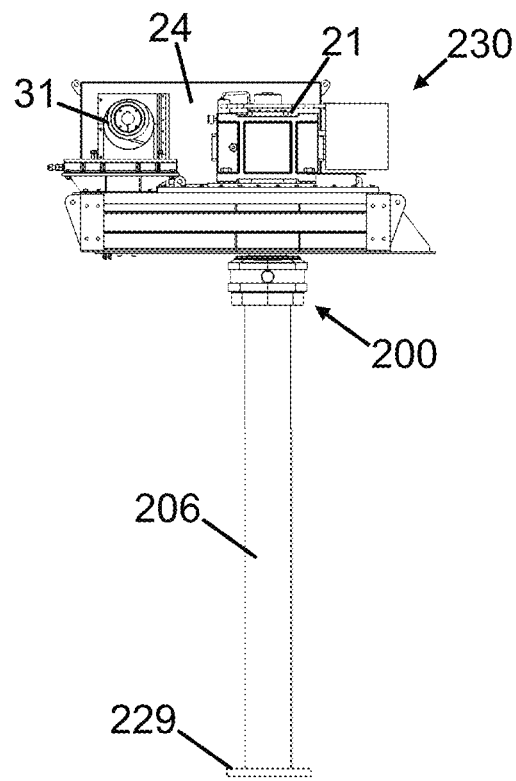
Figure 10:
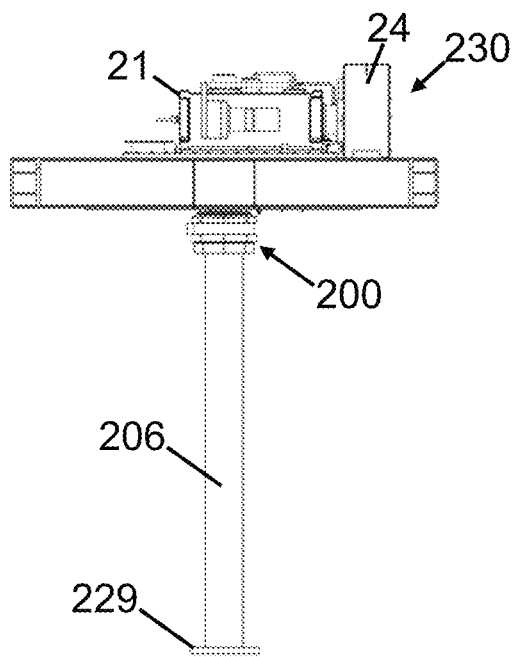
Figure 11:
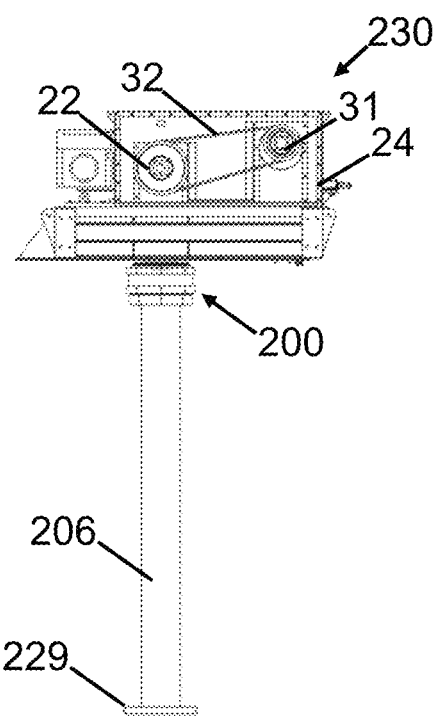
Figure 16:
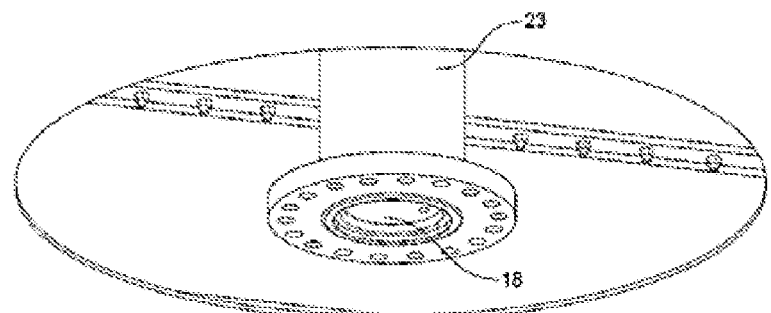
FIGS. 16-18 suggest steps for retrofitting a naturally-aspirated drive assembly according to some embodiments.
Figure 17:
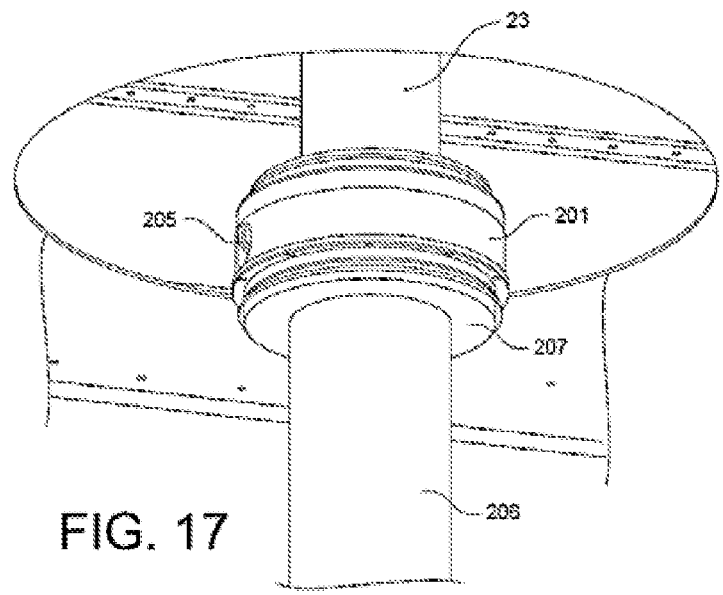
Figure 18:
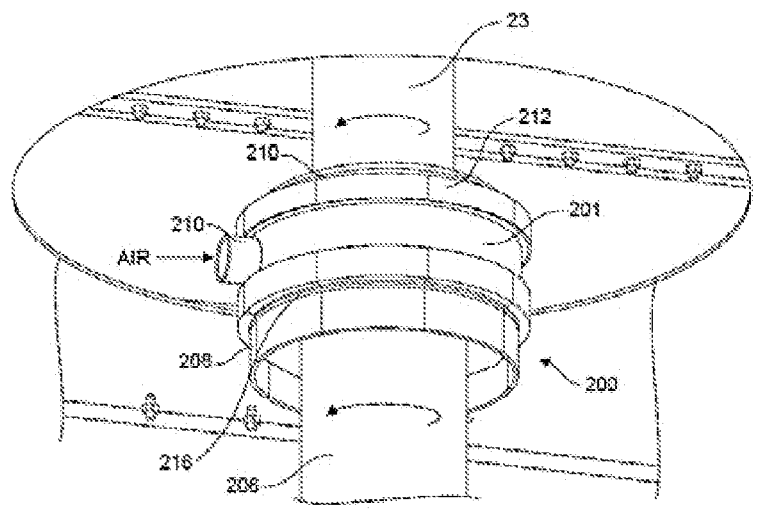
Figure 19:
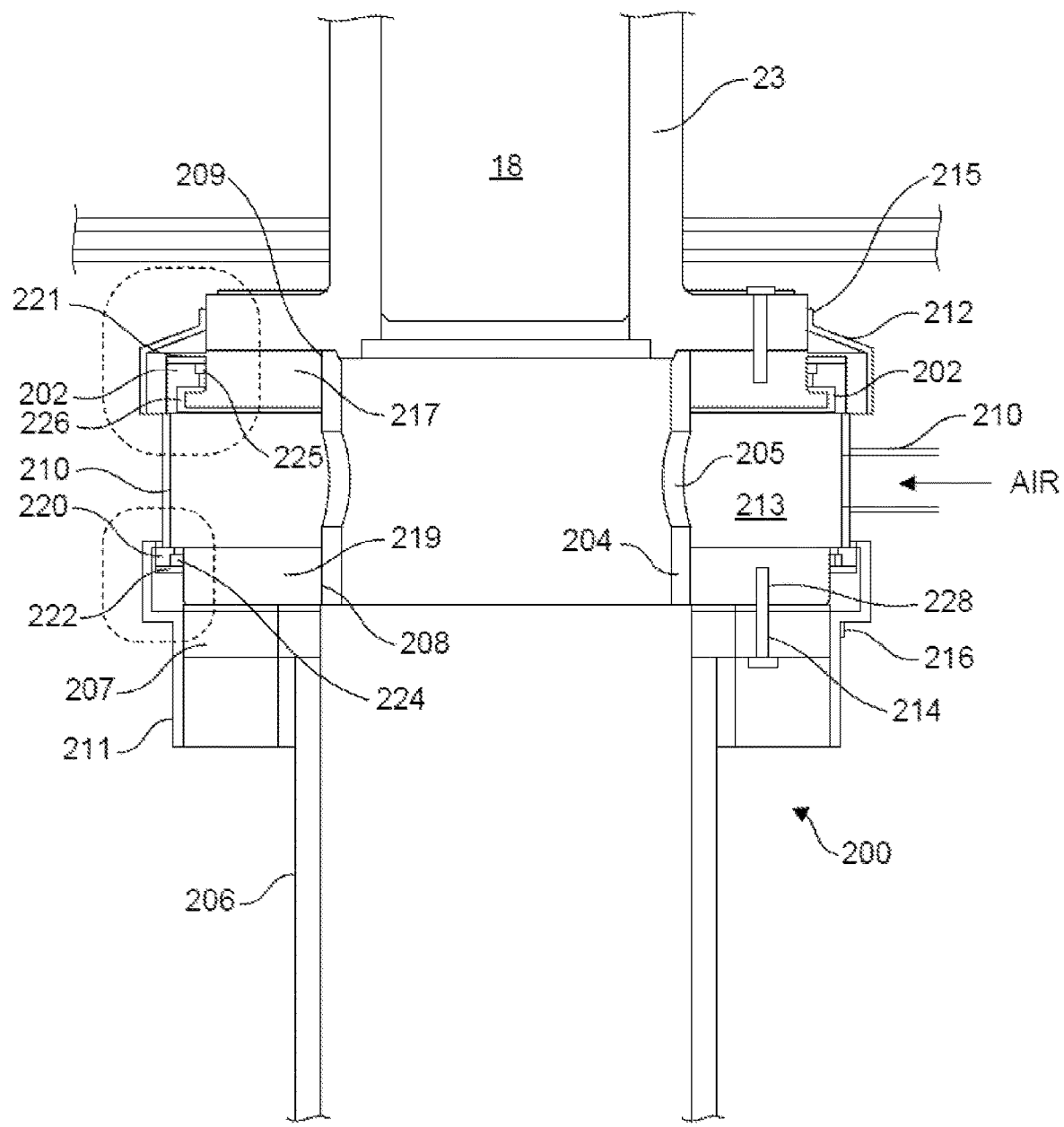

FIG. 6 shows a method 1000 according to some embodiments which employs the adapter apparatus 200 discussed herein and shown in the drawings.

According to some embodiments, as suggested in FIGS. 26-36, an adapter 200 may be made especially for the conversion of small naturally-aspirated flotation cells 10 (e.g., those having tanks 1 less than approximately 250 cubic meters) and/or those naturally-aspirated flotation cells 10 which might employ a gearless/transmission-less, pulley drive-only reducer 21. This adapter 200 may be configured to be serviced by periodic lubrication and may be located above a slurry/pulp/froth level, without limitation.

Figures 26, 27:
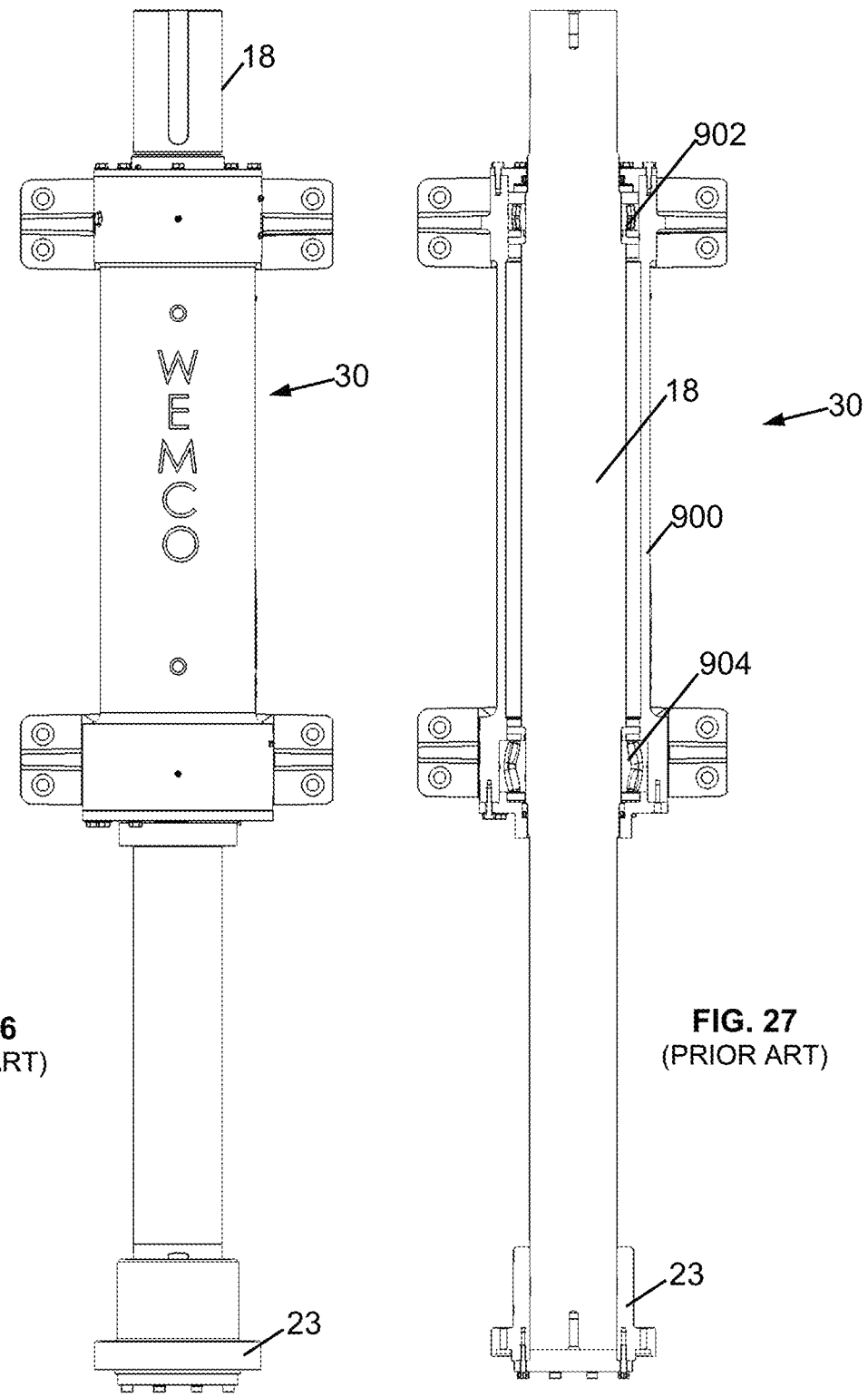
FIGS. 26 and 27 show portions of a prior art conventional drive assembly 30 for a naturally-aspirated flotation cell having a reducer 21, wherein (unlike the embodiment shown in FIG. 1), the reducer 21 of the drive assembly 30 is entirely configured as a pulley drive, with no gearbox/transmission.
Figure 28:
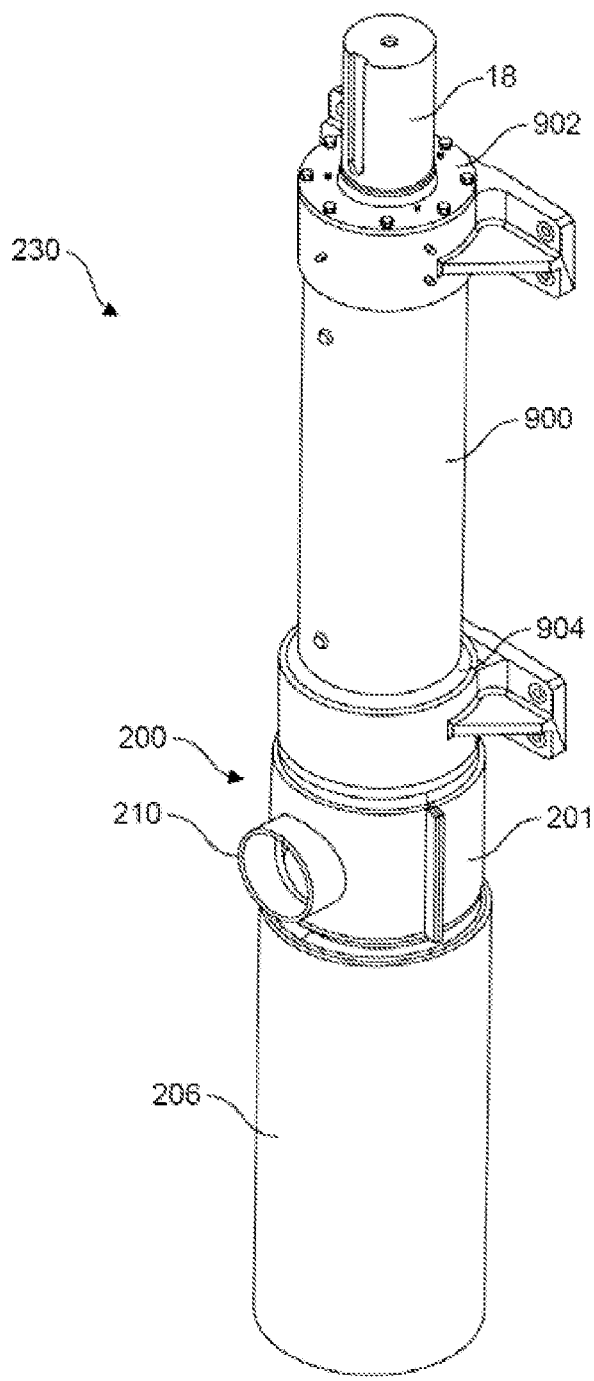
FIG. 28 shows a novel adapter 200 communicating with the prior art conventional drive assembly 30 portions shown in FIGS. 26 and 27.
Figure 29:
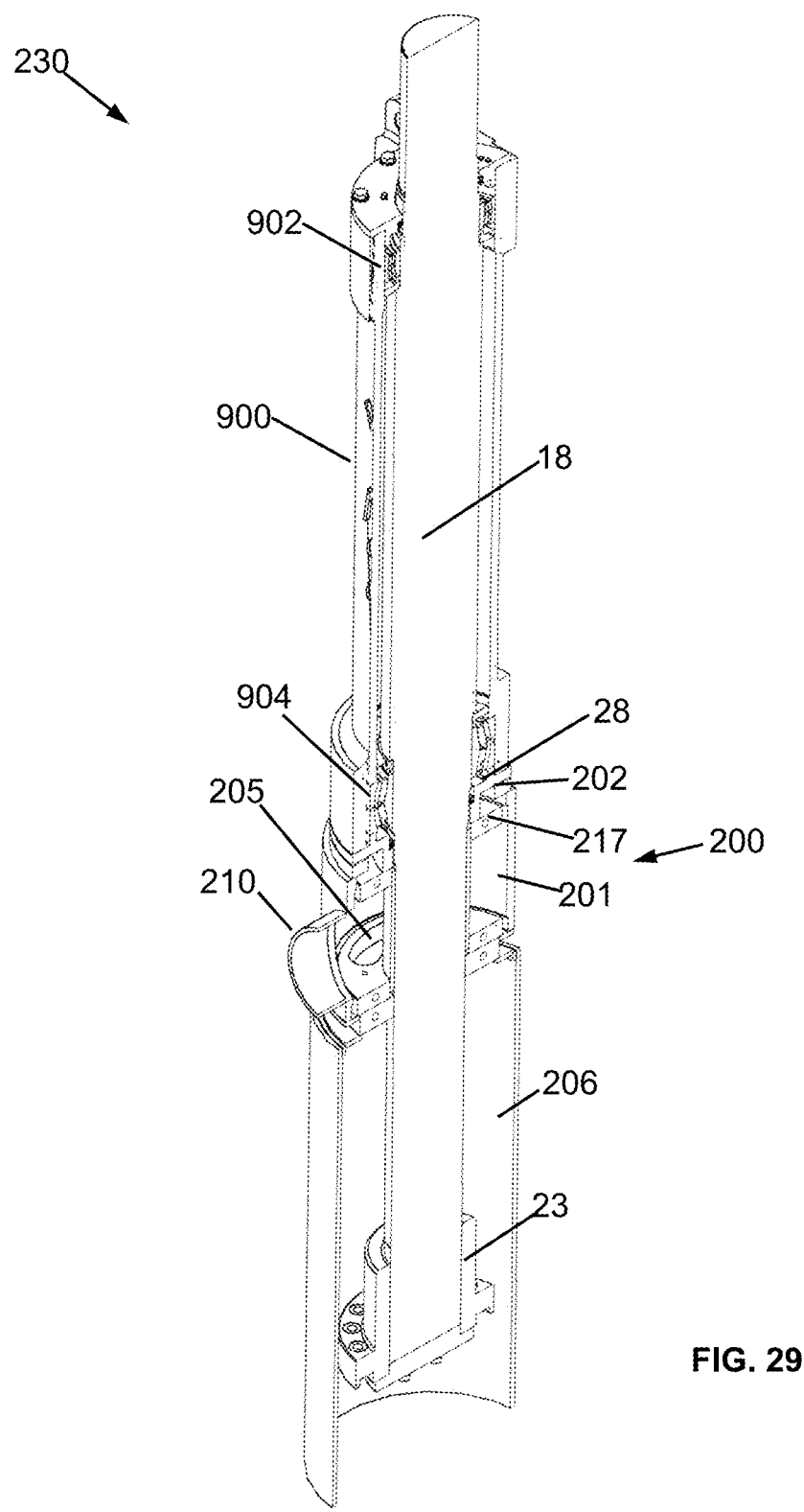
FIG. 29 is a partial cutaway view of FIG. 28.
Figure 30:
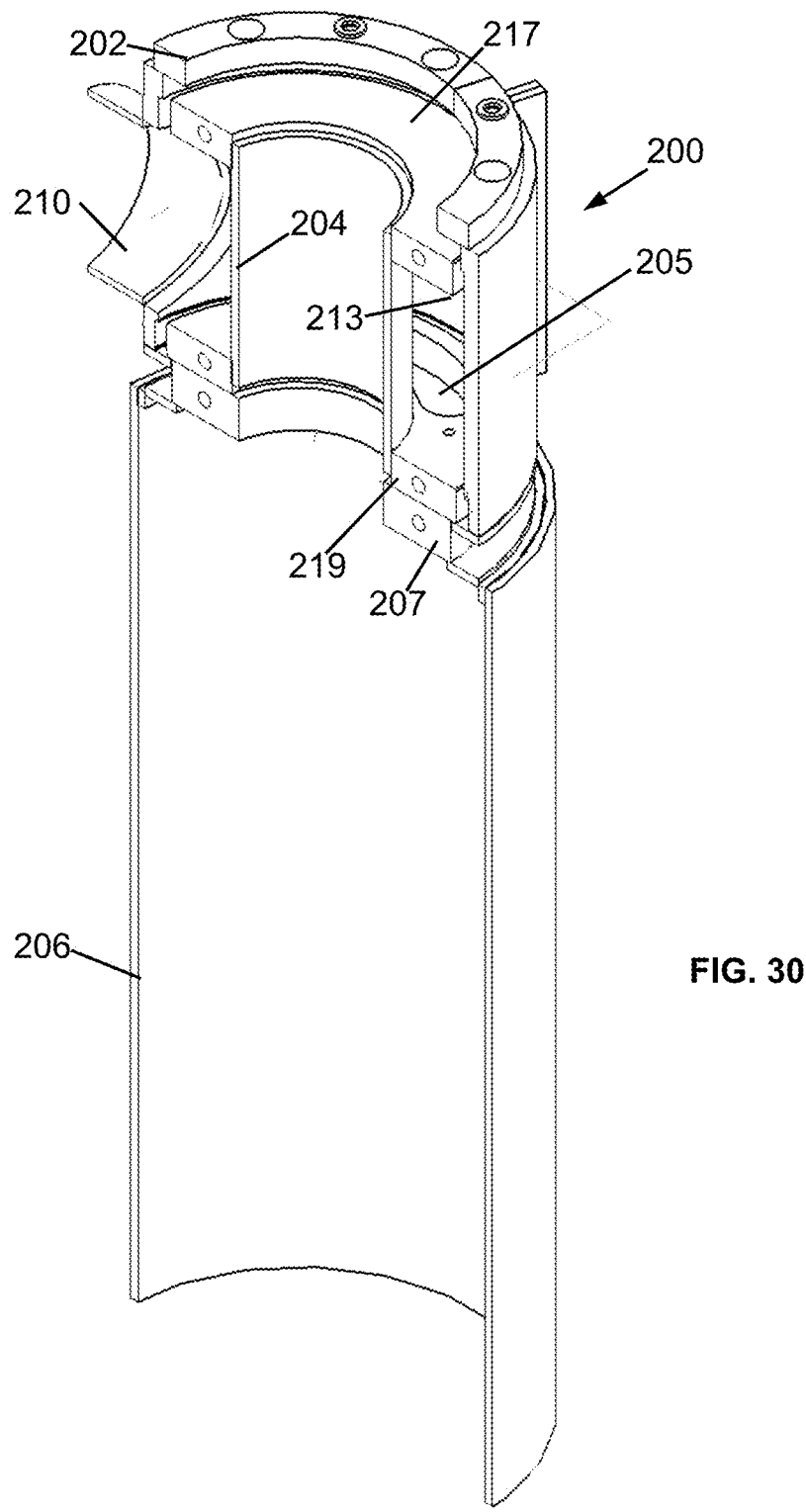
FIGS. 30-32, 35, and 36 more clearly show internal components of an adapter 200 according to some embodiments.
Figure 31:
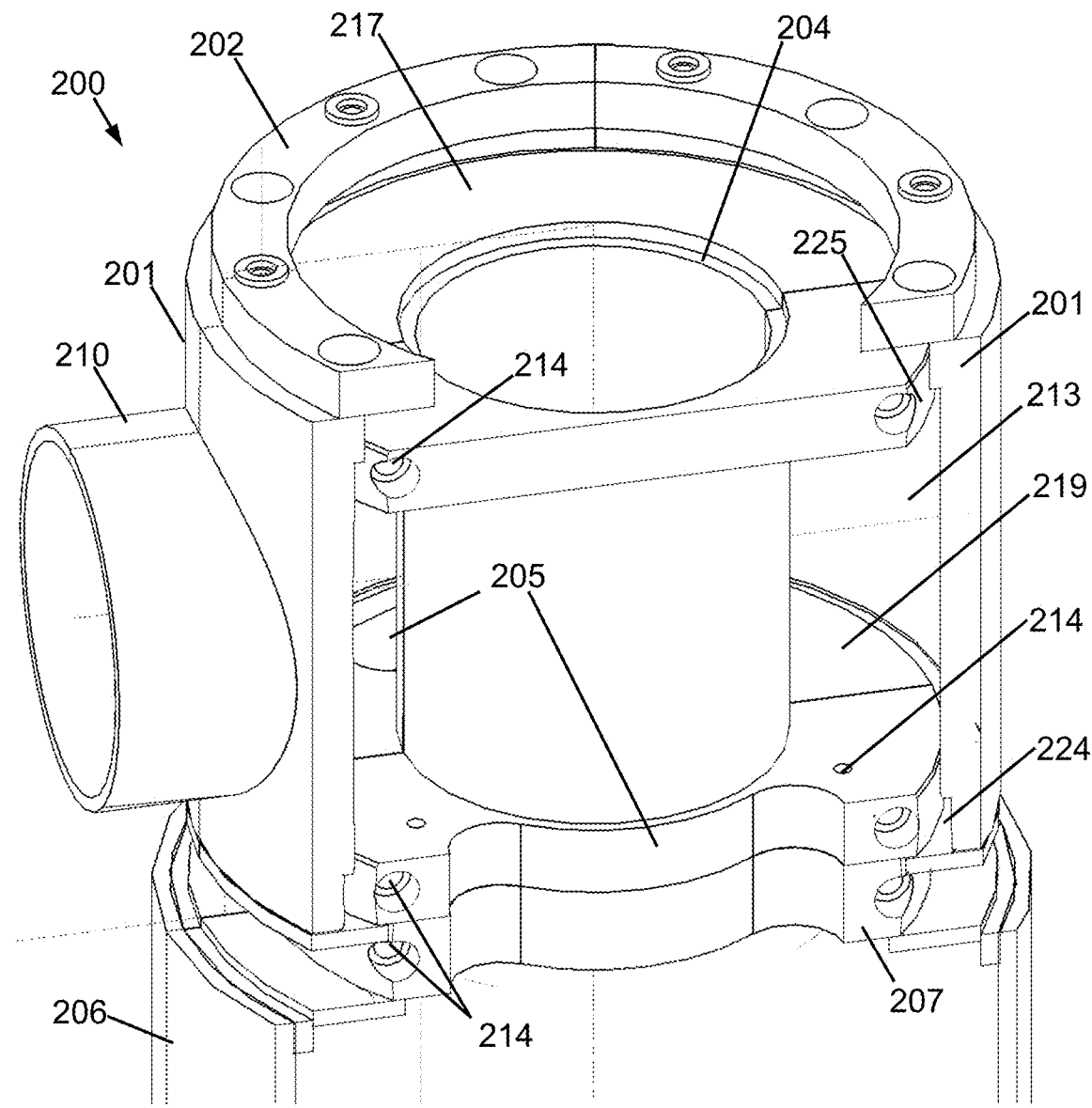
Figure 32:
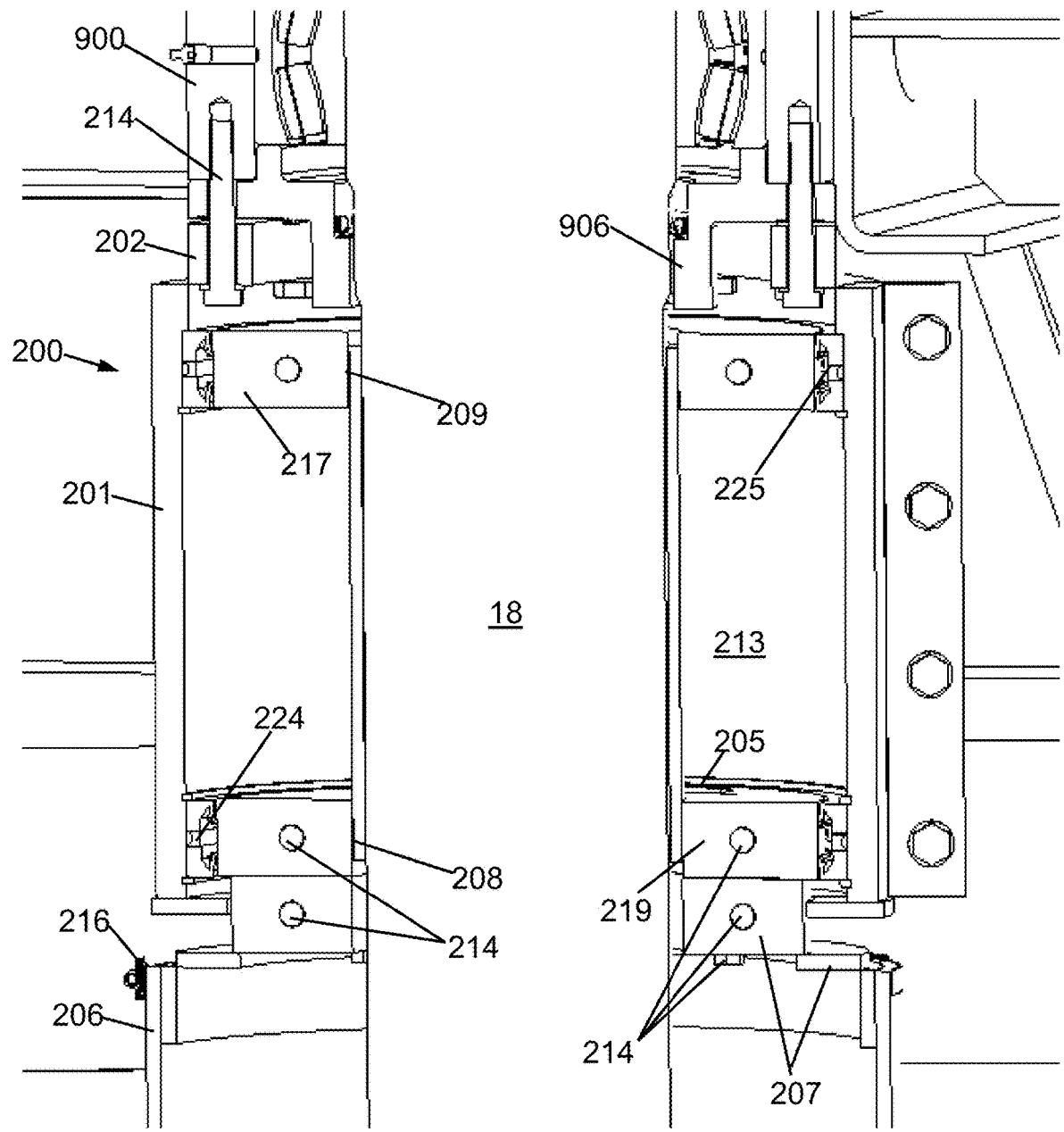
Figure 33:
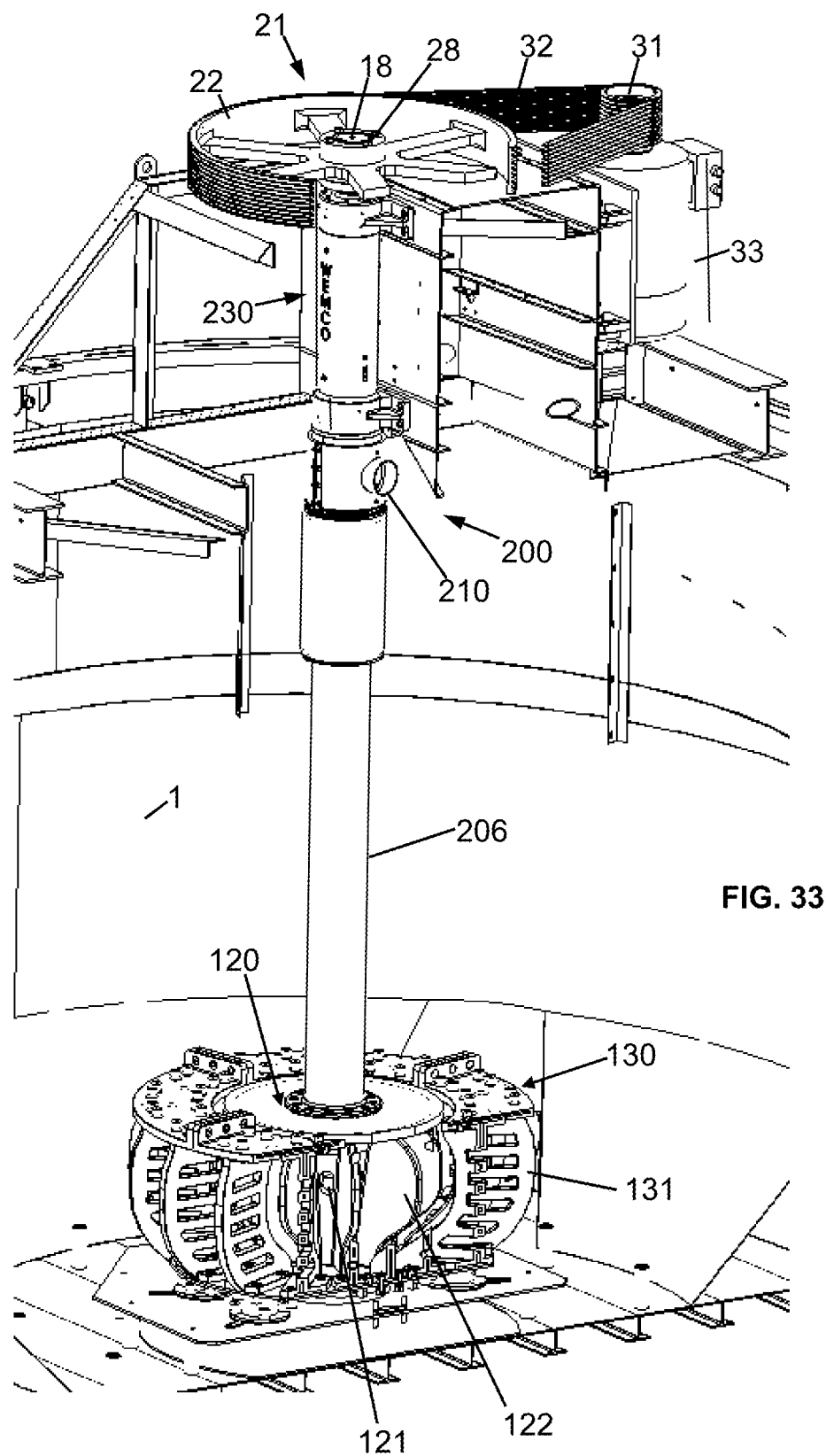
FIG. 33 shows a naturally-aspirated flotation cell 10 which has been converted to a forced-gas flotation cell by providing an adapter 200 to an upper shaft 18 according to some embodiments.
Figure 34:
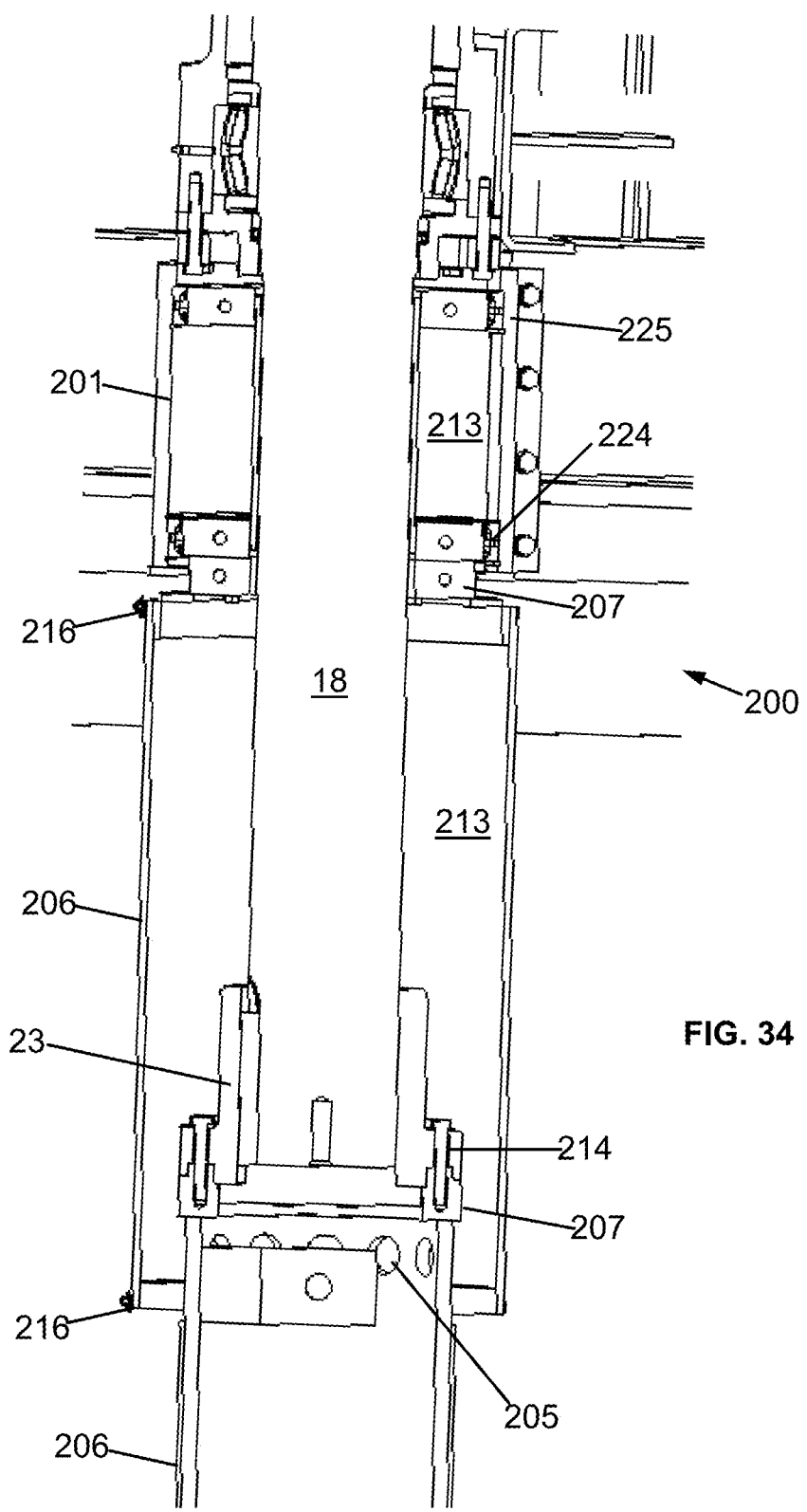
FIG. 34 shows a lower middle portion of a drive assembly 230 according to some embodiments, wherein mounting portions 207 of a lower shaft 206 may be attached to the upper shaft 18 in two places, and wherein the lower shaft 206 at least partially surrounds the upper 18 shaft to form a chamber 213 for air/gas to pass. In the particular embodiment shown, a mounting portion 207 of the lower shaft 206 is connected to a mounting portion 23 of the upper shaft 18.
Figure 35:
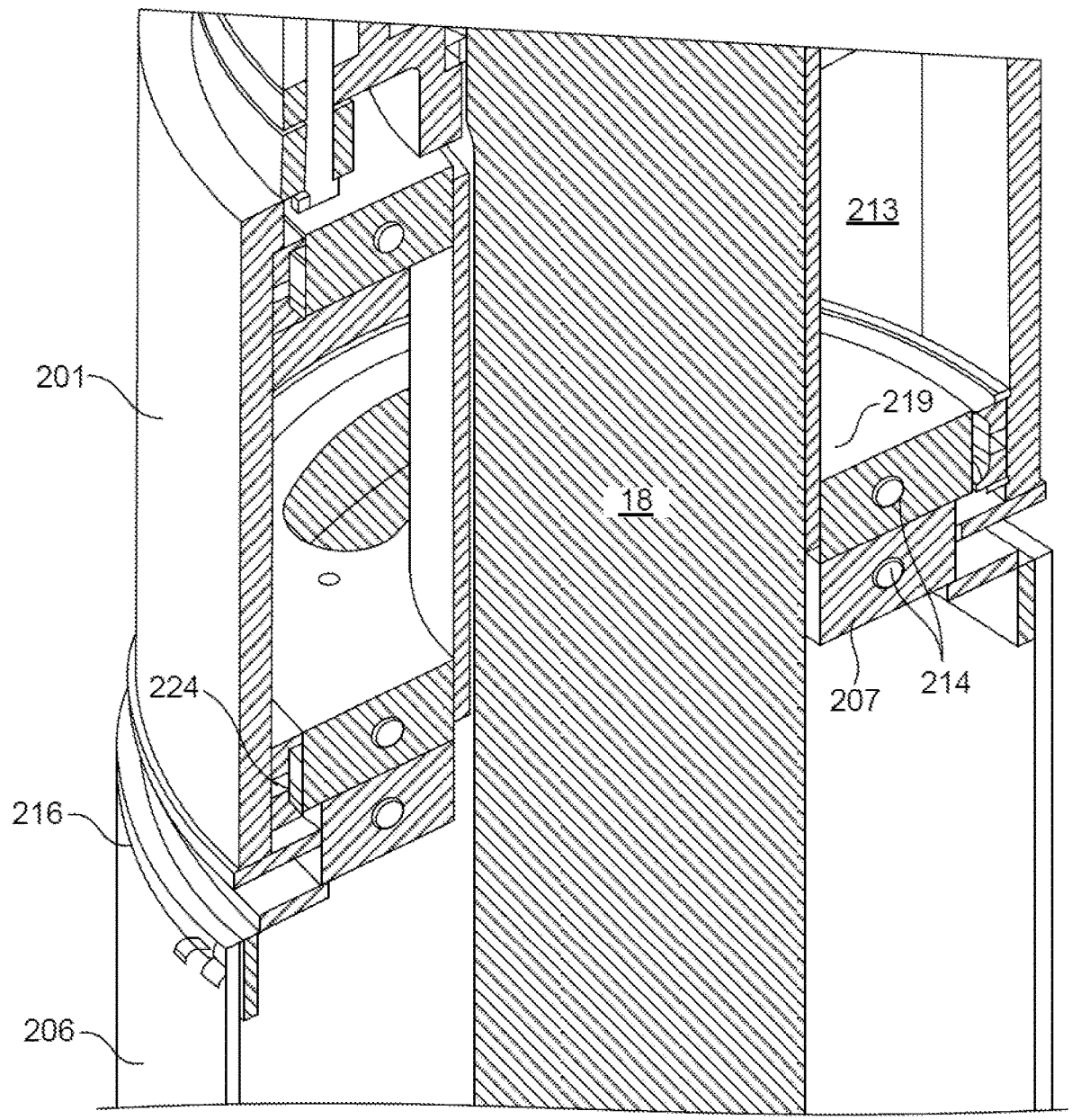

Turning now to FIGS. 26, 27, and 33, a conventional naturally-aspirated flotation cell may comprise a gearless (i.e., a "pulley-only") drive assembly 30. The drive assembly 30 may comprise a large housing 900 comprising upper 902 and lower 904 bearings to support and center an upper shaft 18. The upper shaft 18 may be coupled to an output 28 of a reducer 21; the reducer 21 comprising a motor 33, drive pulley 31 which turns a belt 32, and a driven pulley 22 which has a spline or other anti-rotation feature that securely engages the upper shaft 18.

Turning now to FIGS. 28-36, a novel adapter 200 according to certain embodiments may be attached to the naturally-aspirated drive assembly 30 to create a novel converted drive assembly 230 which is configured for producing forced-gas flotation.

The adapter 200 may comprise a stationary/static outer casing 201 comprising an inlet 210 for receiving air or gas. A spanner 204 having an upper inner spool 217 and a lower inner spool 219 may be provided within the static casing 201, the spanner 204 being able to receive the upper shaft 18, which extends therethrough. The spanner 204 may be secured to the upper shaft 18 by virtue of a mounting portion 207 clamped thereto. The mounting portion 207 may comprise, as shown, a clamshell annular device. The lower inner spool 219 of the spanner 204 may be fastened to the mounting portion 207 to hold the spanner 204 to the upper shaft 18, such that there is little or no rotational or axial movement therebetween. The static outer casing 201 may comprise a 202 on its upper end which can be utilized to secure the static outer casing 201 to the housing 900 of the original naturally-aspirated flotation cell drive assembly 30. As in the embodiment shown, one or more fasteners 214 may extend from the upper outer spool 202 and into an endcap 906 and/or housing 900, without limitation.

An upper seal 225 and/or a lower seal 224 may be provided between the static casing 201 and portions of the spanner 204 (e.g., spools 217, 219), without limitation. The upper 225 and/or lower 224 seals may, like seal 226, be provided as bearings and/or may possess certain mechanical or physical properties which would allow them to act as bearings, without limitation. In some embodiments, the seals 224, 225 may be serviceable. For example, in some embodiments, the seals 224 may be lubricated from time to time, for example, when servicing the upper 902 and lower 904 bearings of housing 900, without limitation.

As shown, the inner spools 217, 219 and mounting portion(s) 207 may be provided as clamshell annular devices which may be connected together in split fashion, and secured by one or more fasteners 214, without limitation. This may facilitate installation of the adapter 200 around upper shaft 18, without necessarily having to remove or displace upper shaft 18 from a naturally-aspirated flotation cell tank 1 during the retrofitting process.

The mounting portion 207 may be operatively connected to the lower shaft 206, which is preferably hollow to allow room for the upper shaft 18 to fit within an upper portion of the lower shaft 206, and also allow air to pass through a lower portion of the lower shaft 206 so that it can pass to a rotor 120 and exit ports 121.

The converted drive assembly 230 may comprise one or more clips 216 designed to secure the lower shaft 206 to a mounting portion 207 secured to the upper shaft 18, without limitation. As suggested in FIG. 34, a mounting portion 207 of the lower shaft 206 may be fixed to the mounting portion 23 of an upper shaft 18 by a number of fasteners 214, without limitation.

Figure 36:
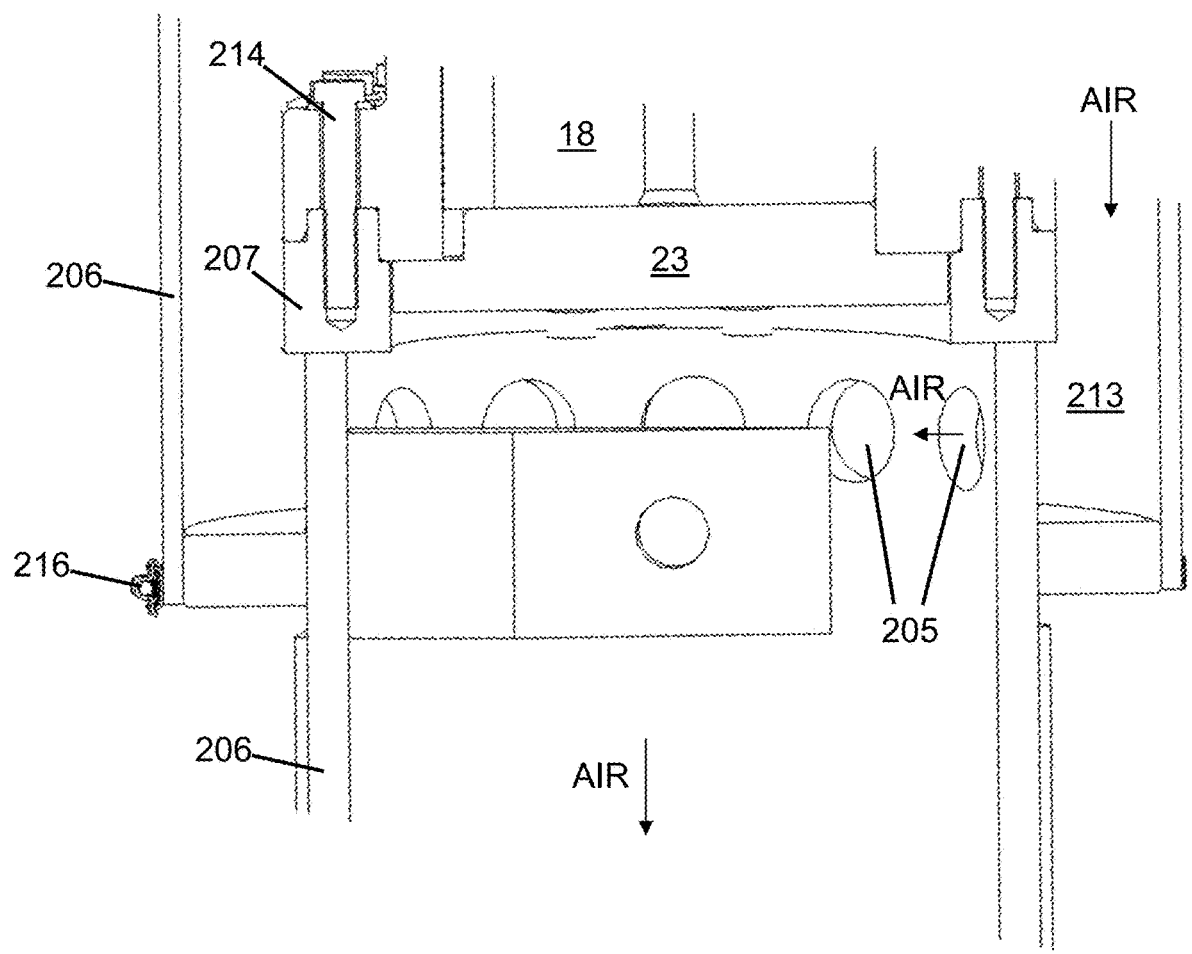

As further depicted in FIG. 36, a number of ports 205 may be provided to an internal portion of a lower shaft 206. The port(s) 205 provided may be configured as fluid passages that allow gas (e.g., air) to travel from a chamber 213 at an upper portion of the lower shaft 206, downwards to the rotor 206, via a hollow lower portion of the lower shaft 206 as shown.

According to both of the exemplary, non-limiting, preferred embodiments, spanner 204 comprises a tubular structure. In one embodiment, the tubular structure serves as a passage for air, and in another embodiment, the tubular structure serves to receive the upper shaft 18 therethrough.

Example

According to some non-limiting embodiments, a test plan or sales pitch may be created before a customer or end user decides to retrofit existing naturally-aspirated flotation cells with adapters 200. For example, one or more end user sites may be identified. The test plan or sales pitch may be modified, depending on a number of variables (e.g., process, goals, performance, materials being processed, etc.).

In some instances, an approach may include an end user (e.g., a customer or client) requesting a test and/or providing funding for the conversion of one or more naturally-aspirated flotation cell machines to forced-gas machines. Once it is determined which approach is to be used (e.g., whether a testing, sale, installation, subcontract, fabrication, approach is sought), one or more of the following steps may take place:

a) Identify a client that wishes to complete a conversion of a traditional naturally-aspirated flotation cell to a forced-air flotation cell (e.g., "WEMCO® to Dorr-Oliver® conversion").

b) Determine if a full reducer 21 and/or BHSA replacement is required or can be avoided with the use of a specialized adapter 200 according to the invention. In other words, determine if purchase and installation of a specialized reducer 103 can be avoided by re-using the existing reducer 21 and adding an adapter 200.

c) Gain agreement/approval for a first installation of a full flotation cell retrofit to include the adapter 200 in addition to, and as a redundant system to, a specialized reducer 103 having an integral "air box". In other words, redundantly add the adapter 200 shown in FIG. 6 or 19 to the prior art cell 100 shown in FIGS. 2 and 3, to create a redundant forced-gas conversion flotation cell capable of air inclusion through the conversion reducer 103 and/or the adapter 200 (this embodiment is not shown).

d) Operate the twice-converted and redundant forced-gas flotation cell using the inventive adapter 200; but, if the adapter 200 fails during operation—remove casing 201, seals 203, 224, 225, 226, bearings 226, etc. from the adapter 200, and simply run the machine 100 with the air feed via the specialized conversion reducer 103 receiving air or gas through conduit 104. An advantage to the end user (once the adapter 200 is proven), is that it may provide a unique opportunity to save significant cost when retrofitting the rest of a plant or other naturally-aspirated flotation cells within a circuit or flotation cell bank.

e) Develop a "test only" version of the retrofit adapter 200 device which could be installed on any machine size. Rather than operating via the adapter 200, include a flow meter and pressure gage and monitor for changes. In this regard, the adapter 200 may be clamped to an existing naturally-aspirated flotation cell mechanism and then left to run. Though it may not be the actual or main intended source of air for flotation operation, it could be monitored to ensure that the adapter 200 at least functions and continues to function as it should for true service, while being exposed to normal operating contamination conditions.

f) Perform a complete "try-and-buy" installation using the novel adapter 200 concept. Retrofitting of the old reducer 21 may be needed as a backup for testing. Accordingly, a specialized reducer 103 replacement may be offered for availability to a client, as a backup, and installation on standby, in the event unforeseen problems arise with the adapter 200.

f) Add the novel adapter 200 to an existing forced-air machine, such as a Dorr-Oliver installation—such that if a failure occurs, the system may simply be returned to its original forced-air configuration or operated as it normally would be without the adapter 200. It is acknowledged that there may be no significant motivation for a client or end user of a retrofit system to do this, and therefore, this option is less desirable.

It is important to keep in mind that testing performance of an adapter 200 on smaller naturally-aspirated flotation machines may present lower risks and/or may prove to be more cost-effective than testing forced-air conversion on larger naturally-aspirated machines (e.g., a 250 m$^3$ WEMCO® flotation machine or greater). With that being said, testing conditions may be essentially the same, regardless of the size or volume of the naturally-aspirated flotation tank being used for conversion. Accordingly, there does not appear to be any significant problems associated with preliminary testing being done at smaller sizes (for proof of design purposes).

The disclosure of every patent, patent application, and publication cited, listed, named, or mentioned herein is hereby incorporated by reference in its entirety, for any and all purposes, as if fully set forth herein.

While this subject matter has been disclosed with reference to specific embodiments, it is apparent that other embodiments and variations can be devised by others skilled in the art without departing from the true spirit and scope of the subject matter described herein. The appended claims may include some, but not all of such embodiments and equivalent variations.

The described embodiments are to be considered in all respects only as illustrative and not restrictive. The scope of the invention is, therefore, indicated and governed only by the appended claims, rather than by the foregoing description. All embodiments which come within the meaning and range of equivalency of the claims are to be embraced within their scope.

Where used herein, the terms "air" and "gas" may be used interchangeably, and that "forced-air" and "forced-gas" may be used interchangeably, with neither term being necessarily broader or narrower than the other. The Applicant acknowledges that "air" is technically/traditionally a narrower specie of the broader genus "gas", and that "forced-air" is a term of art which is used more prevalently and/or which is more widely-accepted within the field of endeavor than the term "forced-gas". It should be understood that any gas could be sparged into a forced-air flotation cell. Accordingly, for purposes of this disclosure, the terms "air" and "gas" may each include pure air, one or more gasses not normally found in pure air, and/or various combinations thereof, without limitation.

A contractor or other entity may provide a forced-gas drive assembly 230 converted from a drive assembly 30 of a naturally-aspirated flotation cell 10 within the mining, pulp and paper, or waste-water treatment industries as substantially shown and herein described. Or, a contractor or other entity may operate a flotation cell apparatus which has been converted to a forced-gas design in whole, or in part, using the methods and/or apparatus shown and described.

A contractor or other entity may fabricate a drive assembly 230 as substantially shown and described herein, so as to convert a naturally-aspirated flotation cell to a forced-gas flotation cell. A contractor or other entity may receive a bid request for a project related to designing, fabricating, delivering, installing, operating, or performing maintenance on a naturally-aspirated flotation cell 10, drive assembly 30 or component therein, with the intention or purpose of converting the naturally-aspirated flotation cell 10 to a forced-gas flotation cell. Or, a contractor or other entity may offer to design such a device or apparatus (e.g., adapter 200), or provide a process or service pertaining thereto, for a client. A contractor or other entity may offer to retrofit or may retrofit a naturally-aspirated flotation cell with any one or more of the components described herein (e.g., drive apparatus, pressure tank, pneumatic piping, pneumatic fittings, forced-gas adapter, forced-gas upper/lower shaft, forced-air rotor, forced-air stator, and/or the like, without limitation).

The contractor or other entity may provide, for example, any one or more of the inventive actions, devices, or features shown and/or described in the embodiments discussed above in any enabled combination, permutation, or fashion. The contractor or other entity may provide such devices or features by selling those devices or features; or, by offering to sell those devices or features. The contractor or other entity may provide various embodiments that are sized, shaped, specked, and/or otherwise configured to meet the design criteria of a particular client or customer or end user of a flotation cell or spare parts therefor.

The contractor or other entity may subcontract or facilitate the fabrication, delivery, sale, and/or installation of any component(s) of the apparatus disclosed, or, of any component(s) of a device which might be used to reproduce inventive aspects of the embodiments disclosed—in particular, the novel drive apparatus (e.g., adapter 200, drive assembly 230) and method steps for fabrication and/or installation described herein. The contractor or other entity may also survey a site or design or designate one or more storage areas for stacking material used to manufacture the devices described herein (e.g., a drive assembly, motor and/or a reducer from a naturally-aspirated flotation cell which is to be remanufactured and/or used or incorporated into a flotation cell tank as a retrofit element in the conversion of a naturally-aspirated flotation cell to a forced-gas flotation cell, without limitation). Moreover, multiple contractors or other entities may work in concert together; simultaneously, or individually at different times—each party providing one or more of the inventive concepts, features, or novel method steps disclosed herein.

The contractor or other entity may also maintain, modify, retrofit, or upgrade a provided flotation cell 10, 100, drive apparatus 30, 230 or one or more components thereof. The contractor or other entity may provide such maintenance, modifications, retrofits, or upgrades by subcontracting such services or by directly providing those services or components needed for said maintenance, modifications, retrofits, or upgrades; and, in some cases, the contractor or other entity may modify an existing naturally-aspirated flotation cell by virtue of a "forced-gas retrofit kit" or provision of a "forced-gas drive assembly" to arrive at a modified naturally-aspirated flotation cell apparatus comprising components for conversion to forced-gas technology as described herein, or to arrive at one or more of the inventive steps, design features, devices, or inventive concepts of the systems, apparatus, processes, or steps thereof discussed herein.

Although the invention has been described in terms of particular embodiments and applications, one of ordinary skill in the art, in light of this teaching, can generate additional embodiments and modifications without departing from the spirit of or exceeding the scope of the claimed invention.

REFERENCE NUMERAL IDENTIFIERS

1. Flotation cell tank
7. Mounting portion
10. Conventional naturally-aspirated flotation cell assembly
11. Frame
12. Crowder (conventional naturally-aspirated)
13. Hood (conventional naturally-aspirated)
14. Disperser (conventional naturally-aspirated)
15. Rotor (conventional naturally-aspirated)
16. Lower shaft (conventional naturally-aspirated)
17. Connection/joint (e.g., flanged or threaded connection)
18. Upper shaft (conventional naturally-aspirated)
19. Gearing
20. Air intake
21. Reducer, e.g., gearbox, pulley system, transmission, or the like (conventional naturally-aspirated)
22. Driven pulley (conventional naturally-aspirated)
23. Mounting portion (e.g., flange, threaded connection, etc.)
24. Shroud (conventional naturally-aspirated)
25. Output drive shaft
26. Bolted connection
27. Lower floor
28. Output
29. Upper floor/support plate
30. Drive assembly
31. Drive pulley (conventional naturally-aspirated)
32. Belt (conventional naturally-aspirated)
33. Drive motor (conventional naturally-aspirated)
100. Converted forced-air flotation cell assembly (conventional naturally-aspirated to forced-air)
101. Conversion drive assembly (conventional naturally-aspirated)
102. Conversion motor (conventional specialized replacement part)
103 Conversion reducer, e.g., gearbox or transmission (conventional specialized replacement part)
104. Conversion conduit (conventional specialized replacement part)
106. Conversion lower shaft (conventional specialized replacement part)
107. Conversion shroud (conventional specialized replacement part)
117. Conversion connection (e.g., flanged or threaded connection)
118. Conversion upper shaft (conventional specialized replacement part)
120. Conversion rotor
121. Port
122. Blade
130. Stator
131. Blade
200. Adapter
201. Static casing
202. Upper outer race/spool
203. Seal
203A. Seal body
203B. Seal first leg
203C. Seal annular groove
203D. Seal ring 203E. Seal second leg
204. Spanner
205. Port(s)
206. Lower shaft
207. Mounting portion (e.g., flange, threaded connection, etc.)
208. Lower interface
209. Upper interface
210. Forced air inlet
211. Rotating lower flinger shroud
212. Rotating upper flinger shroud
213. Chamber (e.g., pressurizable for air/gas)
214. Fastener, First fastener portion (e.g., externally-threaded bolt)
215. Upper clip
216. Lower clip
217. Upper inner race/spool
219. Lower inner race/spool
220. Lower outer race/spool
221. Upper retainer
222. Lower retainer
224. Lower seal
225. Upper seal
226. Annular seal (e.g., PTFE, air bearing)
227. Upper second fastener portion (e.g., internally-threaded bore)
228. Lower second fastener portion (e.g., internally-threaded bore)
229. Rotor mount (e.g., flange)
230 Conversion drive assembly
231. Conduit
900. Housing/casing
902. Upper bearing
904. Lower bearing
906. Endcap
1000. Method

The invention claimed is:

1. A method of converting a naturally-aspirated flotation cell (10) to a forced-gas flotation cell comprising the steps of:
providing a drive assembly (30) for a naturally-aspirated flotation cell (10), the drive assembly (30) having a naturally-aspirated flotation cell reducer (21), and a lower shaft (16) attached to or at least configured to attach to a naturally-aspirated flotation cell rotor (15); the lower shaft (16) being configured to position the naturally-aspirated flotation cell rotor (15) in a central portion of a tank (1) of the naturally-aspirated flotation cell (10);
CHARACTERISED IN THAT the method further comprises the steps of:
keeping the naturally-aspirated flotation cell reducer (21) with the provided drive assembly (30), thereby avoiding replacement of the naturally-aspirated flotation cell reducer (21) with a specialized conversion reducer (103);
removing the lower shaft (16) from the drive assembly (30);
providing an adapter (200) for the drive assembly (30), the adapter (200) comprising:
an outer static casing (201) having a forced gas inlet (210);
an inner rotating spanner (204) having at least one port (205) therein;
sealing means (203, 224, 225, 226) provided between the static casing (201) and the spanner (204); and,
a chamber (213) formed between the outer static casing (201) and the spanner (204); and,
connecting the adapter (200) to the drive assembly (30) to form a forced- gas drive assembly (230).

2. The method of claim 1, wherein the step of connecting the adapter (200) to the drive assembly (30) comprises connecting a mounting portion (23) of an upper shaft (18) to an upper inner spool (217) of the spanner (204); the upper shaft (18) being connected to the naturally-aspirated flotation cell reducer (21).

3. The method according to claim 1, further comprising the step of:
connecting the adapter (200) to a lower shaft (206), the lower shaft (206) being attached to, or at least configured to attach to a forced gas flotation cell rotor (120).

4. The method according to claim 3, wherein the step of connecting the adapter (200) to the lower shaft (206) comprises connecting a mounting portion (207) of the lower shaft (206) to a lower inner spool (219) of the spanner (204).

5. The method according to claim 1, further comprising the steps of:
supplying gas to the chamber (213), via the forced gas inlet (210); and
forcing gas in the chamber (213) through the at least one port (205).

6. The method according to claim 5, further comprising the step of moving gas from the chamber (213) to the inside of a lower shaft (206) connected to the adapter (200).

7. The method according to claim 1, further comprising providing a conduit (231) to the forced gas inlet (210) for supplying gas to the chamber (213).

8. The method according to claim 1, further comprising: attaching a forced gas flotation cell rotor (120) to a lower shaft (206); the forced gas flotation cell rotor (120) having one or more blades (122) and one or more ports (121).

9. The method according to claim 8, comprising moving gas from the chamber (213) of the adapter (200), to the one or more ports (121) of the forced gas flotation cell rotor (120).

10. The method according to claim 3, further comprising:
preventing gas in the chamber (213) or lower shaft (206) from entering the naturally-aspirated flotation cell reducer (21).

11. The method according to claim 10, wherein gas in the chamber (213) or lower shaft (206) is prevented from entering the naturally-aspirated flotation cell reducer (21) by virtue of providing a solid or hollow but sealed upper shaft (18) between the adapter (200) and the naturally-aspirated flotation cell reducer (21).

12. The method according to claim 2, further comprising:
applying a rotating upper flinger shroud (212) to the mounting portion (23) of the upper shaft (18), and providing an upper clip (215) to fasten the rotating upper flinger shroud (212) to the mounting portion (23) of the upper shaft (18).

13. The method according to claim 4, further comprising:
applying a rotating lower flinger shroud (211) to the mounting portion (207) of the lower shaft (206), and providing a lower clip (216) to fasten the rotating lower flinger shroud (211) to the mounting portion (207) of the lower shaft (206).

14. The method according to claim 1, further comprising:
attaching an upper retainer (221) to an upper outer spool (202) to hold in place, a first annular seal (225) of said sealing means, the first annular seal (225) extending between the upper outer spool (202) and the upper inner spool (217) to close a gap between the static casing (201) and the spanner (204) and seal the chamber (213).

15. The method according to claim 14, further comprising: attaching a lower retainer (222) to a lower outer spool (220) to hold in place, a second annular seal (224) of said sealing means, the second annular seal (224) extending between the lower outer spool (220) and the lower inner spool (219) to close a gap between the static casing (201) and the rotating spanner (204) and seal the chamber (213).

16. A forced-gas flotation cell manufactured from a naturally- aspirated flotation cell (10) comprising:
a drive assembly (230) having a naturally-aspirated flotation cell reducer (21) from the naturally-aspirated flotation cell (10), and a lower shaft (206) attached to or at least configured to attach to a forced-gas flotation cell rotor (120); the lower shaft (206) being configured to position the forced-gas flotation cell rotor (120) adjacent a bottom portion of a tank (1) of the forced-gas flotation cell as compared to in a central portion of a tank (1) for the naturally-aspirated flotation cell (10);
CHARACTERISED IN THAT the drive assembly (230) comprises:
the naturally-aspirated flotation cell reducer (21) of the naturally-aspirated flotation cell reducer (21), thereby avoiding replacement of the naturally-aspirated flotation cell reducer (21) with a specialized conversion reducer (103); and,
an adapter (200) connected to the drive assembly (30), the adapter (200) comprising:
an outer static casing (201) having a forced gas inlet (210);
an inner rotating spanner (204) having at least one port (205) therein;
sealing means (203, 224, 225, 226) provided between the static casing (201) and the spanner (204); and,
a chamber (213) formed between the outer static casing (201) and the spanner (204).

17. The forced-gas flotation cell of claim 16, wherein a mounting portion (23) of an upper shaft (18) is connected to an upper inner spool (217) of the spanner (204); the upper shaft (18) being connected to the naturally- aspirated flotation cell reducer (21).

18. The forced-gas flotation cell according to claim 16, wherein the adapter (200) is connected to the lower shaft (206), the lower shaft (206) being attached to, or at least configured to attach to a forced gas flotation cell rotor (120).

19. The forced-gas flotation cell according to claim 18, wherein a mounting portion (207) of the lower shaft (206) is connected to a lower inner spool (219) of the spanner (204).

20. The forced-gas flotation cell according to any claim 16, wherein in operation, gas is supplied to the chamber (213), via the forced gas inlet (210); and gas in the chamber (213) is forced through the at least one port (205) and into the lower shaft (206).

21. The forced-gas flotation cell according to claim 16, comprising a conduit (231) operatively connected to the forced gas inlet (210) for supplying gas to the chamber (213).

22. The forced-gas flotation cell according to claim 16, further comprising a forced gas flotation cell rotor (120) attached to a lower shaft (206); the forced gas flotation cell rotor (120) having one or more blades (122) and one or more ports (121) configured to receive air from the chamber (213) of the adapter (200).

23. The forced-gas flotation cell according to claim 16, wherein gas in the chamber (213) or lower shaft (206) is prevented from entering the naturally-aspirated flotation cell reducer (21) by virtue of a solid or hollow but sealed upper shaft (18) provided between the adapter (200) and the naturally-aspirated flotation cell reducer (21).

24. The forced-gas flotation cell according to claim 17, further comprising a rotating upper flinger shroud (212) applied to the mounting portion (23) of the upper shaft (18), and an upper clip (215) provided thereto, to fasten the rotating upper flinger shroud (212) to the mounting portion (23) of the upper shaft (18).

25. The forced-gas flotation cell according to claim 19, further comprising a rotating lower flinger shroud (211) applied to the mounting portion (207) of the lower shaft (206), and a lower clip (216) provided thereto, to fasten the rotating lower flinger shroud (211) to the mounting portion (207) of the lower shaft (206).

26. The forced-gas flotation cell according to claim 16, further comprising an upper retainer (221) attached to an upper outer spool (202) to hold in place, a first annular seal (225) of said sealing means; the first annular seal (225) extending between the upper outer spool (202) and the upper inner spool (217) to close a gap between the static casing (201) and the rotating spanner (204) and seal the chamber (213).

27. The forced-gas flotation cell according to claim 16, further comprising a lower retainer (222) attached to a lower outer spool (220) to hold in place, a second annular seal (224) of said sealing means; the second annular seal (224) extending between the lower outer spool (220) and the lower inner spool (219) to close a gap between the static casing (201) and the rotating spanner (204) and seal the chamber (213).

* * * * *